United States Patent
Tanaka et al.

(10) Patent No.: US 7,450,308 B2
(45) Date of Patent: Nov. 11, 2008

(54) BEAM SHAPING LENS, LENS PART, MOUNTING PLATE, OPTICAL HEAD, OPTICAL INFORMATION RECORDING AND REPRODUCING APPARATUS, COMPUTER, IMAGE RECORDING AND REPRODUCING APPARATUS, IMAGE REPRODUCING APPARATUS, SERVER AND CAR NAVIGATION SYSTEM

(75) Inventors: Toshiyasu Tanaka, Osaka (JP); Yoshiaki Komma, Osaka (JP); Kousei Sano, Osaka (JP); Akihiro Arai, Kyoto (JP)

(73) Assignee: Panasonic Corporation, Osaka (JP)

( * ) Notice: Subject to any disclaimer, the term of this patent is extended or adjusted under 35 U.S.C. 154(b) by 133 days.

(21) Appl. No.: 11/114,775

(22) Filed: Apr. 26, 2005

(65) Prior Publication Data

US 2005/0237639 A1  Oct. 27, 2005

(30) Foreign Application Priority Data

Apr. 27, 2004  (JP)  ............................. 2004-130958

(51) Int. Cl.
*G02B 27/10* (2006.01)
*G02B 7/02* (2006.01)

(52) U.S. Cl. .................. 359/618; 359/628; 359/819

(58) Field of Classification Search .............. 359/819, 359/811, 813, 820, 821, 822, 824, 823, 618, 359/623, 624, 625, 628, 629, 636, 639; 351/819, 351/811, 813, 820, 821, 822, 824, 823

See application file for complete search history.

(56) References Cited

U.S. PATENT DOCUMENTS

| | | | |
|---|---|---|---|
| 5,296,737 A | | 3/1994 | Nishimura et al. |
| 5,453,961 A | * | 9/1995 | Brazas ................. 369/44.23 |
| 5,572,068 A | | 11/1996 | Chun |
| 5,608,708 A | * | 3/1997 | Ophey ................. 369/112.14 |
| 5,612,569 A | | 3/1997 | Murakami et al. |
| 5,637,828 A | | 6/1997 | Russell et al. |
| 5,801,451 A | | 9/1998 | Yamauchi |
| 5,815,372 A | | 9/1998 | Gallas |
| 6,172,931 B1 | | 1/2001 | Cha et al. |

(Continued)

FOREIGN PATENT DOCUMENTS

EP    1 441 334 A2    7/2004

(Continued)

OTHER PUBLICATIONS

European Search Report for EP 05 00 9136, dated Sep. 28, 2006.

*Primary Examiner*—Ricky Mack
*Assistant Examiner*—Brandi N Thomas
(74) *Attorney, Agent, or Firm*—RatnerPrestia

(57) ABSTRACT

A beam shaping lens for shaping an incident beam having an elliptic cross section into an outgoing beam having a substantially circular cross section includes a first plane which is a cylindrical surface having a generating line curving to form a non-circular cylindrical surface as an incidence side of the incident beam and a second plane which is a circular cylindrical surface as an outgoing side of the outgoing beam. The distance between both ends of the generating line of the circular cylindrical surface is larger than the distance between both ends of the generating line of the non-circular cylindrical surface.

19 Claims, 26 Drawing Sheets

U.S. PATENT DOCUMENTS

| | | |
|---|---|---|
| 6,215,192 B1 | 4/2001 | Hirata et al. |
| 6,242,285 B1 | 6/2001 | Kang |
| 2001/0009505 A1 | 7/2001 | Nishizawa et al. |
| 2004/0145997 A1 | 7/2004 | Yasuda et al. |

FOREIGN PATENT DOCUMENTS

| | | | |
|---|---|---|---|
| JP | 63-118714 | | 8/1988 |
| JP | 758281 | | 3/1995 |
| JP | 786526 | | 3/1995 |
| JP | 07-334851 A | | 12/1995 |
| JP | 2000-249885 A | | 9/2000 |
| JP | 2002-208159 | | 7/2002 |
| JP | 2005-049550 | * | 7/2003 |
| JP | 2004-62967 A | | 2/2004 |
| JP | 2004-247032 | | 9/2004 |

* cited by examiner

Fig.7 A
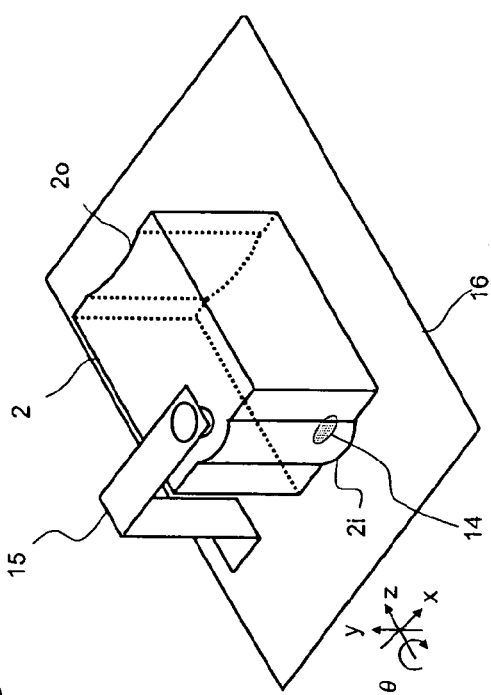
Fig.7 B
Fig.7 C
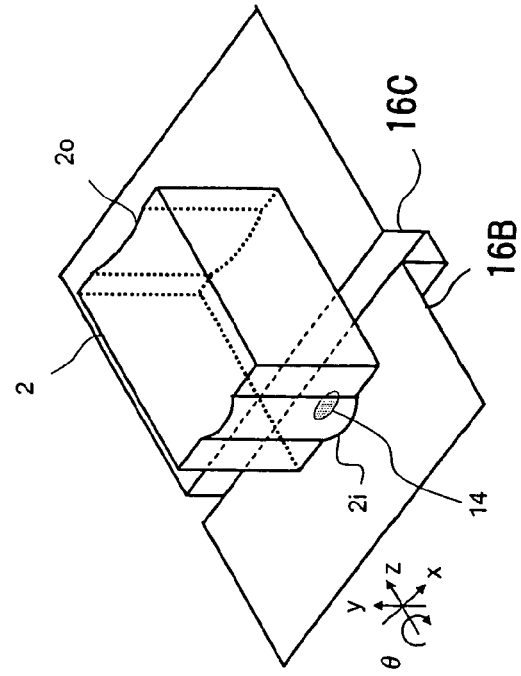
Fig.7 D
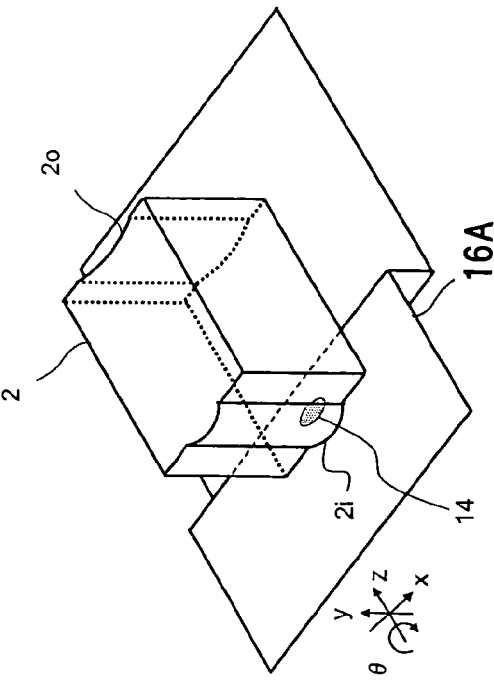

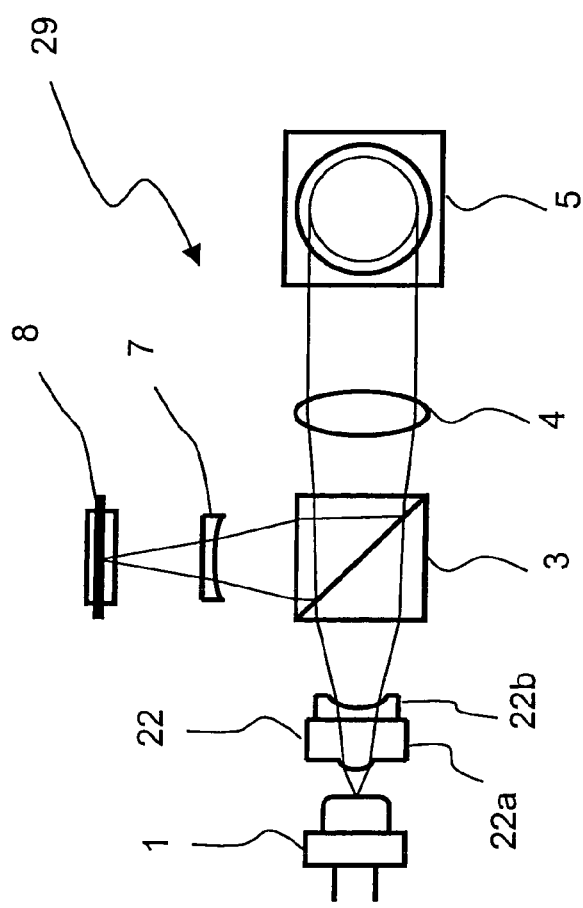
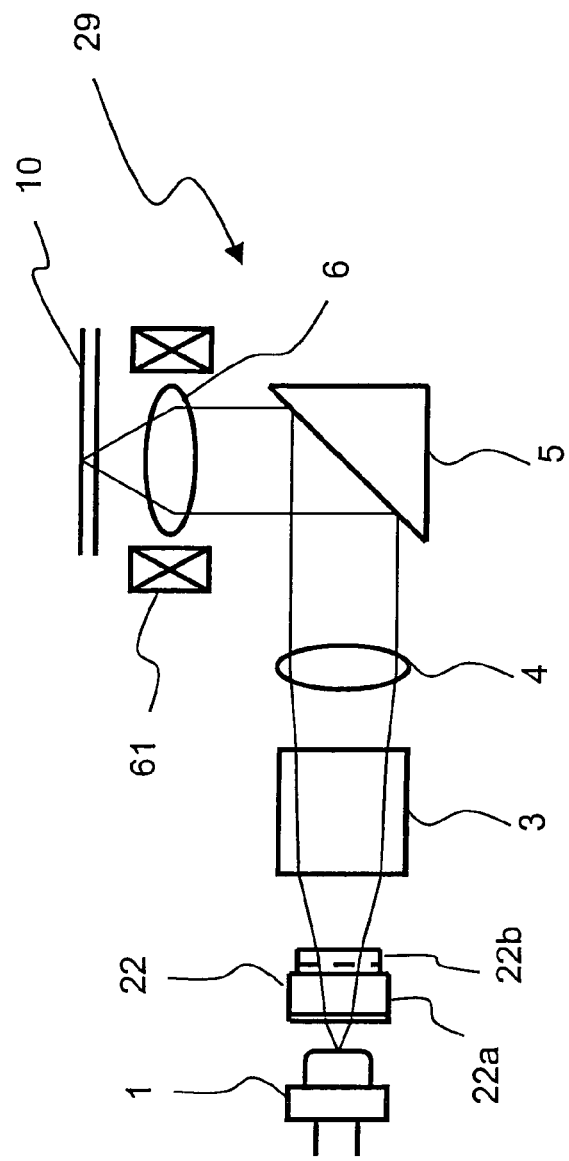
Fig.12 A
Fig.12 B

BEAM SHAPING LENS, LENS PART, MOUNTING PLATE, OPTICAL HEAD, OPTICAL INFORMATION RECORDING AND REPRODUCING APPARATUS, COMPUTER, IMAGE RECORDING AND REPRODUCING APPARATUS, IMAGE REPRODUCING APPARATUS, SERVER AND CAR NAVIGATION SYSTEM

BACKGROUND OF THE INVENTION

1. Field of the Invention

The present invention relates to a beam shaping lens, a lens part relating to it, a mounting plate, an optical head, an optical information recording and reproducing apparatus of irradiating light on an optical disk from the optical head to record or reproduce information, and a computer, an image recording and reproducing apparatus, an image reproducing apparatus, a server and a car navigation system using this.

2. Related Art of the Invention

An optical disk called a DVD (Digital Versatile Disk) as a high-density and large-capacity optical information recording medium is available in the market. Recently, such an optical disk is rapidly becoming widespread as a recording medium of recording images, music and computer data. In recent years, researches on a next-generation optical disk of further enhanced recording density are underway in various places. The next-generation optical disk is anticipated as a recording medium replacing a VTR (Video Tape Recorder) video tape which is currently mainstream, and is under development at a rapid rate.

An optical head of recording or reproducing information on the optical disk comprises a light source, an objective lens of condensing a beam emitted from the light source on the optical disk and a detector of detecting the beam reflected from the optical disk. A semiconductor laser as the light source has the beam radiated from an end face of a thin active layer, and so the beam is in an elliptic form and a ratio between its minor axis and major axis is approximately 1:3 or so. When recording the information on the optical disk, it is desired, from a viewpoint of improving usability of the light, to shape the elliptic beam into a circular form.

Next, first to fourth conventional examples of shaping the beam will be described.

FIG. 23 is a first conventional example of shaping the beam into a circular form (refer to Japanese Utility Model Laid-Open No. 63-118714 (FIGS. 1 and 4) for instance), which shows a schematic diagram of an optical head 309 using a beam shaping lens 302. An elliptic diverging beam emitted from a light source 301 is rendered as a circular diverging beam by the beam shaping lens 302 described later, and is transmitted through a branching prism 303, rendered as a parallel beam by a collimator lens 304, reflected by a mirror 305, condensed by an objective lens 306 and irradiated on an optical disk 310. The beam reflected on the optical disk 310 traces an inverse route to be reflected on the branching prism 303 and detected by a detector 308.

Both sides of the beam shaping lens 302 are cylindrical surfaces, where the beam is refracted and expanded by the cylindrical surface along a minor axis direction of the beam, and is transmitted along a major axis direction without changing its broadening angle so as to shape the elliptic beam into a circular beam.

FIG. 24 is a second conventional example using cylindrical lenses 302a and 302b separately provided spatially (refer to Japanese Utility Model Laid-Open No. 63-118714 (FIGS. 1 and 4) for instance). It is possible, even in such a configuration, to shape the elliptic beam into the circular beam as with the first conventional example.

FIG. 25 is a third conventional example of shaping the beam into a circular form with the lens (refer to Japanese Patent Laid-Open No. 2002-208159 (FIG. 1) for instance). As for a beam shaping lens 402, its first plane 402i and second plane 402o are cylindrical surfaces, where the beam is refracted and expanded by the cylindrical surface along the minor axis direction of the beam, and is transmitted along the major axis direction without changing its broadening angle so as to shape the beam. As the first plane 402i is an aplanatic surface, no aberration arises. A distance on an optical axis from a luminous point of a light source 401 to the first plane 402i is equal to thickness of the beam shaping lens 402 on the optical axis. Therefore, the beam in the minor axis direction vertically gets incident on the second plane 402o so that no aberration arises. The second plane 402o has a cross section of a plane vertical to a central axis of the cylindrical surface (the plane parallel to space of FIG. 25) which is non-circular arc (hereafter, such a cylindrical surface is referred to as a cylindrical surface of a non-circular cylindrical plane). As the second plane 402o is the cylindrical surface of a non-circular cylindrical plane, an aberration of about the same degree as in the major axis direction is generated in the minor axis direction so as to have a spherical aberration of axial rotation symmetry. The spherical aberration generated on the beam shaping lens 402 is eliminated by a collimator lens 404.

FIG. 26 is a fourth conventional example of shaping the beam into a circular form with a prism, showing a schematic diagram of an optical head 509 using a beam shaping prism 502. The diverging beam emitted from a light source 501 is rendered as a parallel beam by a collimator lens 504, is refracted by the beam shaping prism 502 along the minor axis direction of the beam so as to shape the elliptic beam into the circular beam. The circular beam is transmitted through a branching prism 503, reflected by a mirror 505, condensed by an objective lens 506 and irradiated on an optical disk 510. The beam reflected on the optical disk 510 traces an inverse route to be reflected on the branching prism 503, transmitted through a detection lens 507 and detected by a detector 508.

However, the beam shaping lens 302 of a first conventional example shown in FIG. 23 has its beam shaping magnification limited to 1.2 times or so. As for the cylindrical surface of the beam shaping lens 302, the cross section of the plane vertical to the central axis of the cylindrical surface (the plane parallel to space of FIG. 23) is substantially a circular arc (hereafter, such a cylindrical surface is referred to as a cylindrical surface of a circular cylindrical plane). If the beam shaping magnification is set at twice or larger to obtain a substantially circular beam, a high-order aberration of 0.06λ or more (λ is a wavelength of the beam) arises because it is the cylindrical surface of a circular cylindrical plane, and so it not practical.

In the case of using the cylindrical lenses 302a and 302b of a second conventional example shown in FIG. 24, the high-order aberration arises likewise if the beam shaping magnification is set at twice or larger. As the cylindrical lenses 302a and 302b are spatially separate, there is also a problem that the spacing between them varies according to temperature change so that the beam shaping magnification varies and the aberration deteriorates.

The present invention has been made in view of the problems, and an object thereof is to provide the beam shaping lens of which shaping magnification is enhanced and high-order aberration is held down, and the lens part, optical head and so on using it. Another object is to provide the beam shaping lens of which shaping magnification and aberration are stable, and the lens part, optical head and so on using it.

SUMMARY OF THE INVENTION

The 1st aspect of the present invention is a beam shaping lens of shaping an incident beam having an elliptic cross section into an outgoing beam having a substantially circular cross section, comprising:

a plane of incidence which is a cylindrical surface having a generating line curving to form a non-circular cylindrical surface as an incidence side of the incident beam; and an outgoing plane which is a circular cylindrical surface as an outgoing side of the outgoing beam, wherein:

a distance between both ends of the generating line of the circular cylindrical surface is larger than a distance between both ends of the generating line of the non-circular cylindrical surface.

The 2nd aspect of the present invention is the beam shaping lens according to the 1st aspect of the present invention, wherein the plane of incidence is curving convexly against an incidence direction of the incident beam, and the outgoing plane is curving concavely against the outgoing direction of the incident beam.

The 3rd aspect of the present invention is the beam shaping lens according to the 1st aspect of the present invention, wherein the circular cylindrical surface of the outgoing plane is provided so as to have its generating line intersect with all optical paths of a ray of light made by the incident beam refracted on the plane of incidence.

The 4th aspect of the present invention is the beam shaping lens according to the 1st aspect of the present invention, comprising a pair of plane portions provided so as to sandwich the plane of incidence between them.

The 5th aspect of the present invention is the beam shaping lens according to the 4th aspect of the present invention, comprising a pair of plane portions provided so as to sandwich the outgoing plane between them.

The 6th aspect of the present invention is the beam shaping lens according to the 1st aspect of the present invention, wherein a shape of a cross section perpendicular to an optical axis of the incident beam is substantially square.

The 7th aspect of the present invention is the beam shaping lens according to the 1st aspect of the present invention, wherein the shape of a cross section perpendicular to the optical axis of the incident beam is substantially circular or elliptic, having at least one linear portion.

The 8th aspect of the present invention is the beam shaping lens according to the 1st aspect of the present invention, wherein a first lens body having the plane of incidence and a second lens body having the outgoing plane are joined on opposed joint surfaces.

The 9th aspect of the present invention is a beam shaping lens of shaping an incident beam having an elliptic cross section into an outgoing beam having a substantially circular cross section, the lens comprising:

a plane of incidence which is a first circular cylindrical surface as an incidence side of the incident beam; and an outgoing plane which is a second circular cylindrical surface as an outgoing side of the outgoing beam, wherein:

a distance between both ends of a circular arc of the circular cylindrical surface is larger than a distance between both ends of a circular arc of the circular cylindrical surface;

the plane of incidence is curving convexly against an incidence direction of the incident beam;

the outgoing plane is curving concavely against the outgoing direction of the incident beam; and a first lens body having the plane of incidence and a second lens body having the outgoing plane are joined on opposed joint surfaces.

The 10th aspect of the present invention is the beam shaping lens according to the 8th or the 9th aspect of the present invention, wherein the joint surfaces are planes.

The 11th aspect of the present invention is the beam shaping lens according to the 9th aspect of the present invention, wherein size of a cross section perpendicular to an optical axis of the incident beam is mutually different between the first and second lens bodies.

The 12th aspect of the present invention is the beam shaping lens according to the 11th aspect of the present invention, wherein the cross section of the first lens body is larger than the cross section of the second lens body.

The 13th aspect of the present invention is the beam shaping lens according to the 11th aspect of the present invention, wherein the first lens body and the second lens bodies are different from each other in their thickness when viewed from a direction parallel with the optical axis of the incident beam.

The 14th aspect of the present invention is the beam shaping lens according to the 13th aspect of the present invention, wherein the thickness of the first lens body is larger than the thickness of the second lens body.

The 15th aspect of the present invention is a lens part comprising the beam shaping lens according to the 1st or the 9th aspect of the present invention and a mounting plate for mounting the beam shaping lens.

The 16th aspect of the present invention is the lens part according to the 15th aspect of the present invention, comprising a lens supporting means provided on the mounting plate and contacting the beam shaping lens by a plane, a line or two or more points, wherein:

a portion in which the beam shaping lens contacts the lens supporting means is placed in a direction substantially parallel with the optical axis of the incident beam.

The 17th aspect of the present invention is the lens part according to the 16th aspect of the present invention, wherein the lens supporting means is integrally formed with the mounting plate.

The 18th aspect of the present invention is the lens part according to the 16th aspect of the present invention, wherein the lens supporting means is a separate member from the mounting plate.

The 19th aspect of the present invention is the lens part according to the 15th aspect of the present invention, wherein the beam shaping lens and the mounting plate are fixed at a fixed location closer to the plane of incidence than a center of the beam shaping lens.

The 20th aspect of the present invention is the lens part according to the 19th aspect of the present invention, wherein the fixing is performed by applying an elastic force to a portion corresponding to the fixed location on an upper surface of the beam shaping lens.

The 21st aspect of the present invention is the lens part according to the 19th aspect of the present invention, wherein the mounting plate has a difference in level between the plane of incidence side including the fixed location and the outgoing plane of the beam shaping lens.

The 22nd aspect of the present invention is the lens part according to the 19th aspect of the present invention, wherein the mounting plate has a groove portion provided in a direction intersecting with the optical axis direction of the incident beam between the plane of incidence side including the fixed location and the outgoing plane of the beam shaping lens.

The 23rd aspect of the present invention is an optical head comprising:

the lens part according to the 15th aspect of the present invention;

a light source;

condensing means of condensing a diverging beam emitted from the beam shaping lens of the lens part; and a detector of detecting a predetermined beam.

The 24th aspect of the present invention is the optical head according to the 23rd aspect of the present invention, wherein the light source and the lens part are fixed on the same holder.

The 25th aspect of the present invention is the optical head according to the 24th aspect of the present invention, wherein the holder has a windage adjusting mechanism of correcting optical axis inclination of the light source.

The 26th aspect of the present invention is the optical head according to the 24th aspect of the present invention, wherein the holder has a positioning mechanism of correcting a position error of a luminous point of the light source.

The 27th aspect of the present invention is the optical head according to the 24th aspect of the present invention, wherein the holder is press-fitted into the mounting plate of the optical head.

The 28th aspect of the present invention is the optical head according to the 24th aspect of the present invention, wherein the holder is fixed on the mounting plate of the optical head with a swaging tool.

The 29th aspect of the present invention is the optical head according to the 24th aspect of the present invention, wherein the holder is welded to the mounting plate of the optical head.

The 30th aspect of the present invention is the optical head according to the 23rd aspect of the present invention, wherein the condensing means has a collimator lens of converting the outgoing beam having a substantially circular cross section to a substantially parallel beam and an objective lens of condensing the substantially parallel beam on an optical information recording medium, and the collimator lens is movable in the optical axis direction of the incident beam.

The 31st aspect of the present invention is an optical information recording and reproducing apparatus, including:

the optical head according to the 23rd aspect of the present invention;

moving means of relatively moving the optical head and the optical information recording medium; and a control circuit of controlling the optical head and the moving means based on a signal obtained from the optical head.

The 32nd aspect of the present invention is a computer comprising the optical information recording and reproducing apparatus according to the 31st aspect of the present invention as an external storage.

The 33rd aspect of the present invention is an image recording and reproducing apparatus comprising the optical information recording and reproducing apparatus according to the 31st aspect of the present invention, wherein at least an image is recorded and reproduced on the optical information recording medium.

The 34th aspect of the present invention is an image reproducing apparatus comprising the optical information recording and reproducing apparatus according to the 31st aspect of the present invention, wherein at least an image is reproduced on the optical information recording medium.

The 35th aspect of the present invention is a server comprising the optical information recording and reproducing apparatus according to the 31st aspect of the present invention as an external storage.

The 36th aspect of the present invention is a car navigation system comprising the optical information recording and reproducing apparatus according to the 31st aspect of the present invention as an external storage.

The 37th aspect of the present invention is a lens part manufacturing method comprising a process of mounting a beam shaping lens of shaping an incident beam having an elliptic cross section into an outgoing beam having a substantially circular cross section on a mounting platform, wherein the beam shaping lens is fixed at a fixed location closer to the plane of incidence than the center thereof.

The 38th aspect of the present invention is a mounting plate of mounting the beam shaping lens according to the 1st or the 9th aspect of the present invention, comprising a lens supporting means provided on the mounting plate and contacting the beam shaping lens by a plane, a line or two or more points, wherein:

a portion in which the beam shaping lens contacts the lens supporting means is placed in a direction substantially parallel with the optical axis of the incident beam on the beam shaping lens.

As an example of the present invention described above, an optical head comprising a light source, a beam shaping lens of shaping an elliptic diverging beam emitted from the light source into a substantially circular diverging beam, a collimator lens of converting the substantially circular diverging beam to a substantially parallel beam and an objective lens of condensing the substantially parallel beam on an optical information recording medium and a detector of detecting the beam reflected on the optical information recording medium, wherein the beam shaping lens has a pair of cylindrical surfaces curving in the same direction and one of the cylindrical surfaces is a non-circular cylindrical plane while the other is a circular cylindrical plane. It is possible, by having such a configuration, to hold down a high-order aberration to be lower and perform good record reproduction.

It is desirable that the beam shaping lens have a plane portion beside one or both of the cylindrical surfaces. It is possible, by having such a configuration, to hold down a lens-edged plane to the minimum while enlarging its contour to facilitate handling.

It is also desirable that the beam shaping lens be in a form in which the cylindrical surface remote from the light source has larger area than the cylindrical surface close to the light source, and all the light having passed the cylindrical surface close to the light source passes the cylindrical surface remote from the light source. It is possible, by having such a configuration, to prevent the light having passed the cylindrical surface close to the light source from passing the plane portion beside the cylindrical surface remote from the light source and getting incident as unnecessary light within an effective diameter of the objective lens.

It is also desirable that, as for the beam shaping lens, the cylindrical surface close to the light source be the non-circular cylindrical plane and the cylindrical surface remote from the light source be the circular cylindrical plane. It is possible, by having such a configuration, to hold down the high-order aberration to be further lower and perform good record reproduction.

It is also desirable that, as for the beam shaping lens, the form of the cross section vertical to the optical axis is square. It is possible, by having such a configuration, to decide a shaping direction of the beam more easily.

It is also desirable that, as for the beam shaping lens, the shape of the cross section vertical to the optical axis be a form including two substantially parallel straight lines and a circular arc. It is possible, by having such a configuration, to decide a beam shaping direction more easily and enhance rotational accuracy around the optical axis of the two cylindrical surfaces while having a cylindrical form easy to manufacture as a shaping lens.

It is also desirable that a material of the beam shaping lens be glass. It is possible, by having such a configuration, to hold down variation in the aberration due to temperature change to be small.

It is also desirable that fixed positions of a base for mounting the beam shaping lens and the beam shaping lens be further on the light source side than the center of the beam shaping lens. It is possible, by having such a configuration, to hold down the variation in the aberration due to temperature change to be small.

It is also desirable that a lens supporting means contacting the beam shaping lens by a plane, a line or two or more points be formed on a base having the beam shaping lens mounted thereon. It is also desirable that a contact portion between the beam shaping lens and the lens supporting means be substantially parallel with the optical axis in the beam shaping direction. It is possible, by having such a configuration, for the beam shaping lens to move back and forth along its own optical axis without deviating sideways so as to adjust and reduce an amount of generated astigmatism in the entire optical head.

It is also desirable that the base having the beam shaping lens mounted thereon and the lens supporting means are separate members. It is possible, by having such a configuration, to move the beam shaping lens back and forth along its own optical axis at a specific position not inclining the optical axis from the light source so as to adjust and reduce the amount of generated astigmatism in the entire optical head without inclining the optical axis.

It is also desirable that the base having the beam shaping lens mounted thereon and the beam shaping lens be firmly fixed on the plane vertical to the central axis of the cylindrical surface of the beam shaping lens. It is possible, by having such a configuration, to hold down the variation in the aberration due to temperature change to be small.

It is also desirable that the base having the beam shaping lens mounted thereon and the beam shaping lens be crimped by a spring pushing them down along the central axis direction of the cylindrical surface of the beam shaping lens. It is possible, by having such a configuration, to hold down the variation in the aberration due to temperature change to be small.

It is also desirable that the beam shaping lens be comprised of two cylindrical lenses which are joined. It is possible, by having such a configuration, to manufacture the beam shaping lens easily.

It is also desirable that the surface on which the two cylindrical lenses are joined be a flat surface. It is possible, by having such a configuration, to facilitate positioning and rotation adjustment of the two cylindrical lenses.

It is also desirable that the size of the cross section vertical to the optical axis be mutually different between the two cylindrical lenses. It is possible, by having such a configuration, to easily mount the beam shaping lens on the base.

It is also desirable that, as to the two cylindrical lenses, the cylindrical lens close to the light source have a larger size of the cross section vertical to the optical axis. It is possible, by having such a configuration, to fix the light source side of the beam shaping lens on the base. To be more specific, it is possible to hold down the variation in the aberration due to temperature change to be small. In this case, it is desirable that the cylindrical surface remote from the light source have larger area. It is possible, by having such a configuration, to reduce stray light arising from the beam shaping lens.

It is also desirable that the thickness along the optical axis be mutually different between the two cylindrical lenses. It is possible, by having such a configuration, to stably perform the positioning of the beam shaping lens.

It is also desirable that, as to the two cylindrical lenses, the cylindrical lens close to the light source is thicker along the optical axis. It is possible, by having such a configuration, to, fix the light source side of the beam shaping lens on the base.

It is also desirable that the light source and the beam shaping lens be fixed on the same holder. It is possible, by having such a configuration, to hold down the variation in the aberration due to temperature change to be small.

It is also desirable that the holder have a windage adjusting mechanism of correcting optical axis inclination of the light source. It is possible, by having such a configuration, to hold down the variation in the aberration due to temperature change to be small and correct the optical axis inclination of the light source.

It is also desirable that the holder have a positioning mechanism of correcting a position error of a luminous point of the light source. It is possible, by having such a configuration, to hold down the variation in the aberration due to temperature change to be small and correct the position of the luminous point.

It is also desirable that the holder be press-fitted into an optical bench of the optical head. It is possible, by having such a configuration, to hold down the variation in the aberration due to temperature change to be small.

It is also desirable that the holder be fixed on the optical bench of the optical head with swaging tool. It is possible, by having such a configuration, to hold down the variation in the aberration due to temperature change to be small.

It is also desirable that the holder be welded to the optical bench of the optical head. It is possible, by having such a configuration, to hold down the variation in the aberration due to temperature change to be small.

It is also desirable that the collimator lens be movable in the optical axis direction. It is possible, by having such a configuration, to correct a spherical aberration at reduced cost.

The optical head according to the present invention is the one comprising a light source, a beam shaping lens of shaping an elliptic diverging beam emitted from the light source into a substantially circular diverging beam, a collimator lens of converting the substantially circular diverging beam to a substantially parallel beam, an objective lens of condensing the substantially parallel beam on an optical information recording medium and a detector of detecting the beam reflected on the optical information recording medium, wherein the fixed positions of the base for mounting the beam shaping lens and the beam shaping lens are further on the light source side than the center of the beam shaping lens.

It is also desirable to further comprise an adhesive applied only to the side of the beam shaping lens close to the light source in order to join the beam shaping lens to the base.

It is also desirable to further comprise an elastic body of pushing down the beam shaping lens on the side close to the light source of the beam shaping lens.

It is also desirable that the base be in a convex form against the beam shaping lens on the side close to the light source.

It is also desirable that the base be in a concave form against the beam shaping lens between the side close to the light source and the side remote from the light source.

An optical information recording and reproducing apparatus according to the present invention is the one including: the optical head according to the present invention; a rotation system or a transfer system of relatively moving the optical head and the optical information recording medium; and a control circuit of controlling the optical head, rotation system and transfer system based on a signal obtained from the optical head. It is possible, by having such a configuration, to record or reproduce information on the optical information recording medium.

A computer according to the present invention is the one comprising the optical information recording and reproducing apparatus of the present invention as an external storage. It is possible, by having such a configuration, to record or reproduce information on the optical information recording medium.

An image recording and reproducing apparatus according to the present invention is the one comprising the optical information recording and reproducing apparatus of the present invention, wherein an image is recorded and reproduced on the optical information recording medium. It is possible, by having such a configuration, to record or reproduce information on the optical information recording medium.

An image reproducing apparatus according to the present invention is the one comprising the optical information recording and reproducing apparatus of the present invention, wherein an image is reproduced from the optical information recording medium. It is possible, by having such a configuration, to reproduce information on the optical information recording medium.

A server according to the present invention is the one comprising the optical information recording and reproducing apparatus of the present invention as an external storage. It is possible, by having such a configuration, to record or reproduce information on the optical information recording medium.

A car navigation system according to the present invention is the one comprising the optical information recording and reproducing apparatus of the present invention as an external storage. It is possible, by having such a configuration, to record or reproduce information on the optical information recording medium.

According to the present invention, it is possible to enhance the shaping magnification, hold down the high-order aberration and stabilize the shaping magnification and aberration as to the beam shaping lens so as to obtain an advantageous effect of improving usability of the light and being able to support high-speed recording and a double-layer disk.

BRIEF DESCRIPTION OF THE DRAWINGS

FIG. 7A is a schematic diagram of a spring holder of the beam shaping lens according to the first embodiment of the present invention, FIG. 7B is a schematic diagram of another spring holder of the beam shaping lens according to the first embodiment of the present invention, FIG. 7C is a schematic diagram of another base having the beam shaping lens according to the first embodiment of the present invention mounted thereon, and FIG. 7D is a schematic diagram of a further base having the beam shaping lens according to the first embodiment of the present invention mounted thereon;

FIG. 12A is a plan view showing the configuration of the optical head according to a fourth embodiment of the present invention, and FIG. 12B is a side view showing the configuration of the optical head according to the first embodiment of the present invention;

DESCRIPTION OF SYMBOLS

Figure 1:
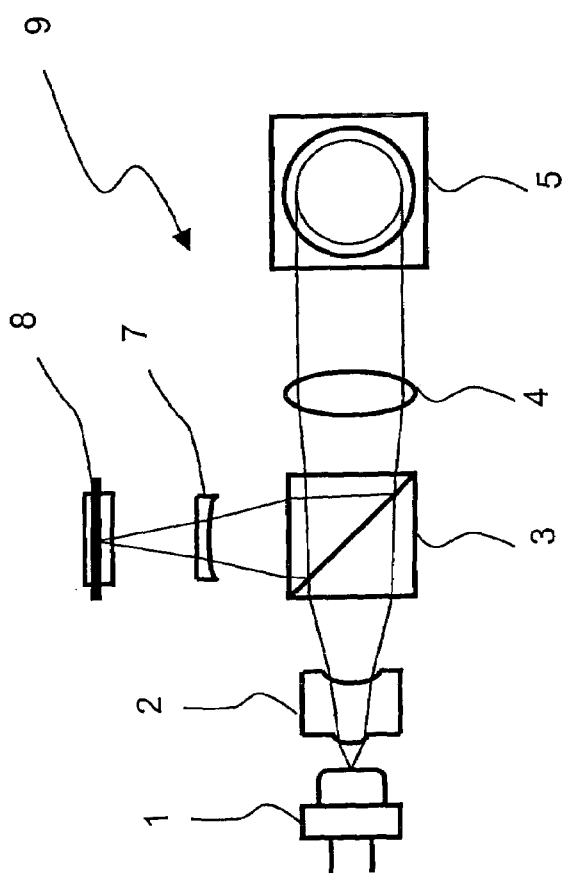
FIG. 1A is a plan view showing a configuration of an optical head according to a first embodiment of the present invention.
FIG. 1B is a side view showing the configuration of the optical head according to the first embodiment of the present invention.
Figure 1:
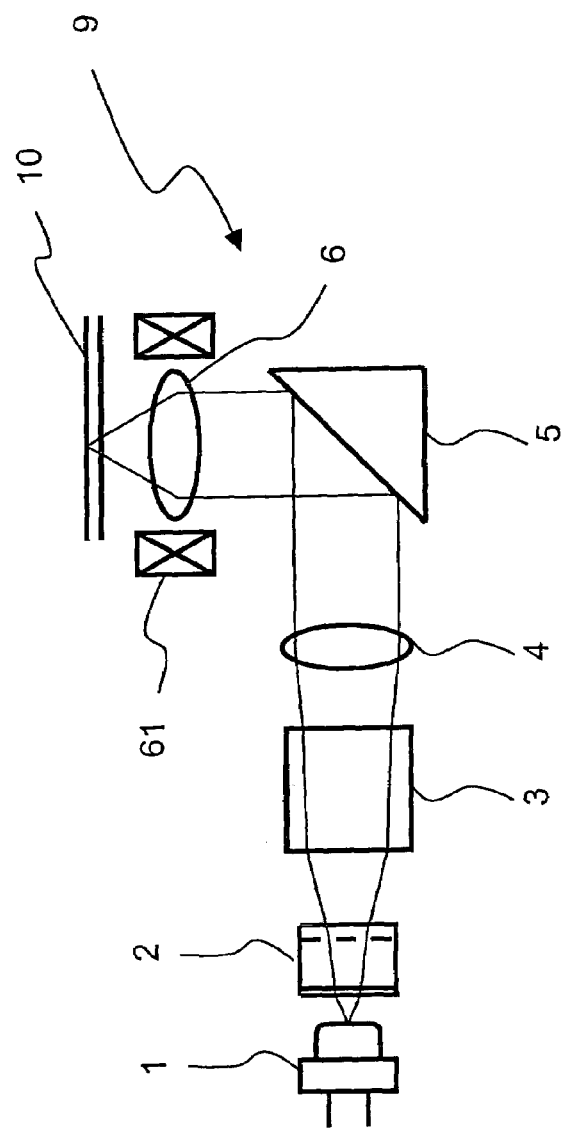

1 Light source
2, 22 Beam shaping lenses
3 Branching prism
4 Collimator lens
5 Mirror
6 Objective lens
7 Detection lens
8 Detector
9, 29, 39 Optical heads
10 Optical disk
11 Holder
12 Adjustment plate
13 Optical bench
14, 24, 34 Adhesives
15 Spring
16 Base
17 Supporting part
18 Supporting spring
21 Luminous point
41 Spherical aberration correction actuator
61 Objective lens actuator
70 Light passing through a first plane and a second plane 2o
71 Light passing through a first plane 2i and a plane portion 2o' (stray light)
100 Optical head
101 Optical disk
102 Turn table
103 Clamper
104 Motor
105 Traverse
106 Control circuit
107 Optical disk drive
110 PC
111 Optical disk drive
120 Optical disk recorder
131 Optical disk player
140 Server
141 Optical disk drive
144 Network
150 Car navigation system 200a, 200b, 210a, 210b Plane portions

PREFERRED EMBODIMENTS OF THE INVENTION

Hereunder, embodiments of the present invention will be described by using FIGS. 1 to 22. The same symbols of the following drawings represent those performing the same actions.

First Embodiment

An optical head 9 according to a first embodiment of the present invention is shown in FIGS. 1A and 1B. FIG. 1A is a top view of the optical head 9, and FIG. 1B is a side view thereof. A beam emitted from a light source 1 is radiated from an end face of a thin active layer, and so the beam is in an elliptic form and a ratio between its minor axis and major axis is approximately 1:3 or so. An elliptic diverging beam emitted from the light source 1 is rendered as a substantially circular diverging beam by a beam shaping lens 2 including the embodiment of the present invention described later, and is transmitted through a branching prism 3, rendered as a substantially parallel beam by a collimator lens 4, reflected by a mirror 5, condensed by an objective lens 6 and irradiated on an optical disk 10. The beam reflected on the optical disk 10 traces an inverse route to be reflected on the branching prism 3, transmitted through a detection lens 7 and detected by a detector 8. The objective lens 6 is driven by an objective lens actuator 61 in a focus direction or a tracking direction based on a detection signal obtained by the detector 8.

According to this embodiment, the light source 1, beam shaping lens 2, branching prism 3, collimator lens 4, mirror 5, detection lens 7, detector 8 and objective lens actuator 61 are fixed on a base 16 described later.

Figure 2:
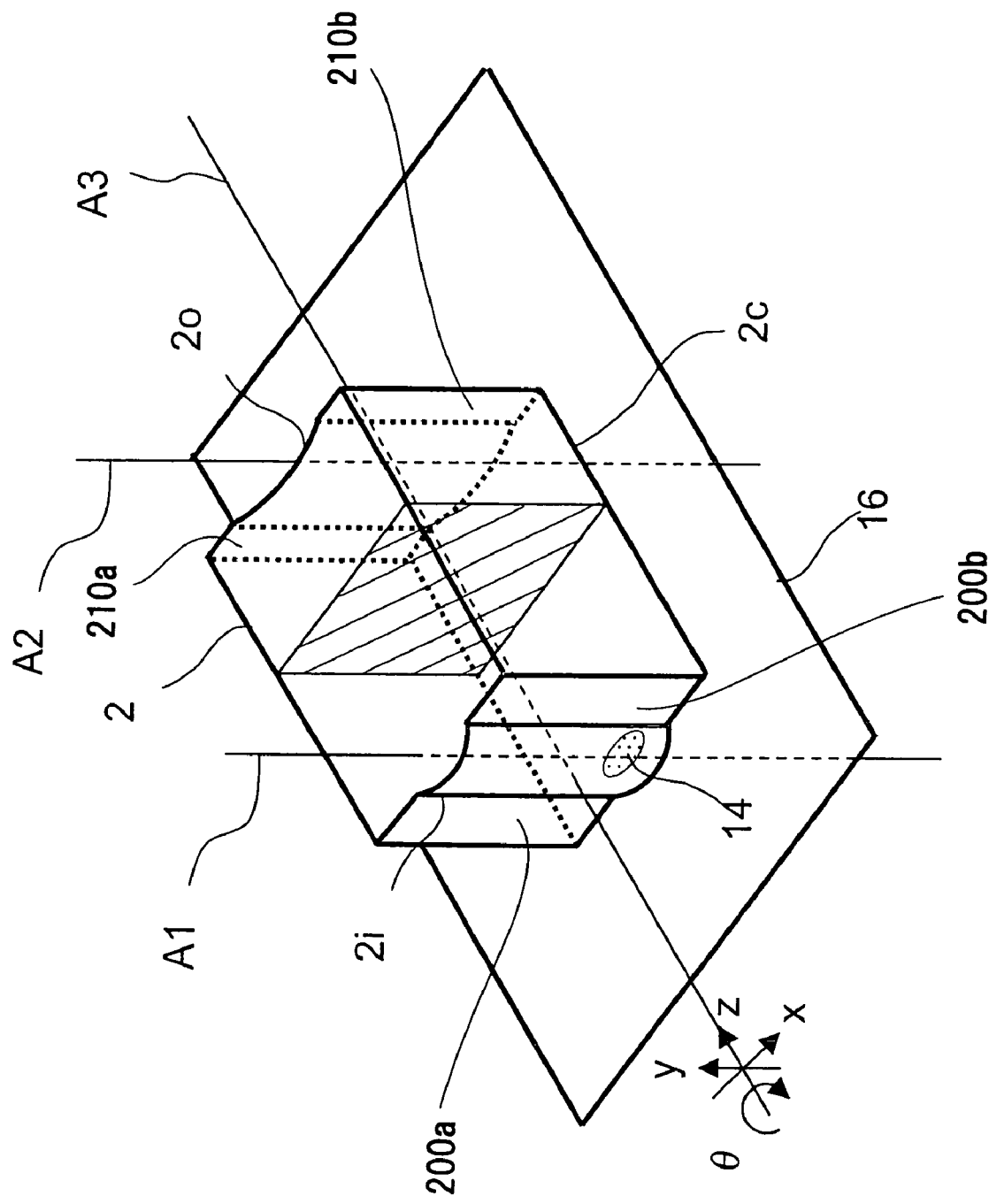
FIG. 2 is a perspective view of a beam shaping lens according to the first embodiment of the present invention.

FIG. 2 shows a perspective view of the beam shaping lens 2 according to the first embodiment of the present invention. The beam shaping lens 2 has a pair of cylindrical surfaces curving in the same direction. Therefore, as opposed to incident beams from the pair of cylindrical surfaces 1, a first plane 2i close to the light source 1 is a convex surface while a second plane 2o remote from it is a concave surface.

If a direction along an optical axis A3 is represented by z, the central axis direction of the cylindrical surface is represented by y, and a direction vertical to the directions z and y is represented by x, the cylindrical surface (first plane) 2i on the side close to the light source 1 has a cross section on a plane xz which is non-circular arc (hereafter, such a cylindrical surface is referred to as a cylindrical surface of a non-circular cylindrical plane). To be more specific, the first plane 2i as the convex surface provided on a beam incidence side of the beam shaping lens 2 is corresponding to a part of the cylindrical surface of a cylinder having the non-circular arc on the plane xz as a generating line.

The cylindrical surface of the second plane 2o on the side remote from the light source 1 has the cross section of the plane xz which is a simple substantial circular arc (hereafter, such a cylindrical surface is referred to as a cylindrical surface of a circular cylindrical plane). To be more specific, the second plane 2i as the concave surface provided on a beam emission side of the beam shaping lens 2 is corresponding to a part of the cylindrical surface of a circular cylinder having the circular arc on the plane xz as a generating line.

With the beam shaping lens 2 having the above configuration, the elliptic beam gets refracted and contracts along its major axis direction as shown in FIG. 1A, and is transmitted along its minor axis direction without changing its broadening angle as shown in FIG. 1B so as to shape the beam having an elliptic cross section form into the beam having a substantially circular cross section form. And the ratio between its minor axis and major axis changes from 1:3 of the elliptic beam to 1:1 to approximately 1:2 of the substantially circular beam. Thus, it is possible, by shaping the cross section of the beam into a substantially circular form, to improve usability of the light and increase optical power condensed on the optical disk 10 so as to support high-speed recording and a double-layer disk and so on.

As shown in FIG. 2, pairs of plane portions 200a, 200b and 210a, 210b are provided on both sides of the first plane 2i and second plane 2o, the pair of cylindrical surfaces respectively.

Handling such as adjustment of the lens is easier if it is in a large contour. This also applies to manufacturing of the lens itself. If in a large contour, however, work area becomes large and it requires cost and time when lens edging is performed on the entire necessary surfaces. Thus, it is possible, as shown in FIG. 2A, to provide the plane portion continuously integrated with the cylindrical surface beside the cylindrical surface so as to hold down the work area of a lens curved surface through which the beam passes as minimum necessary while enlarging the contour of the body of the lens.

Figure 23:
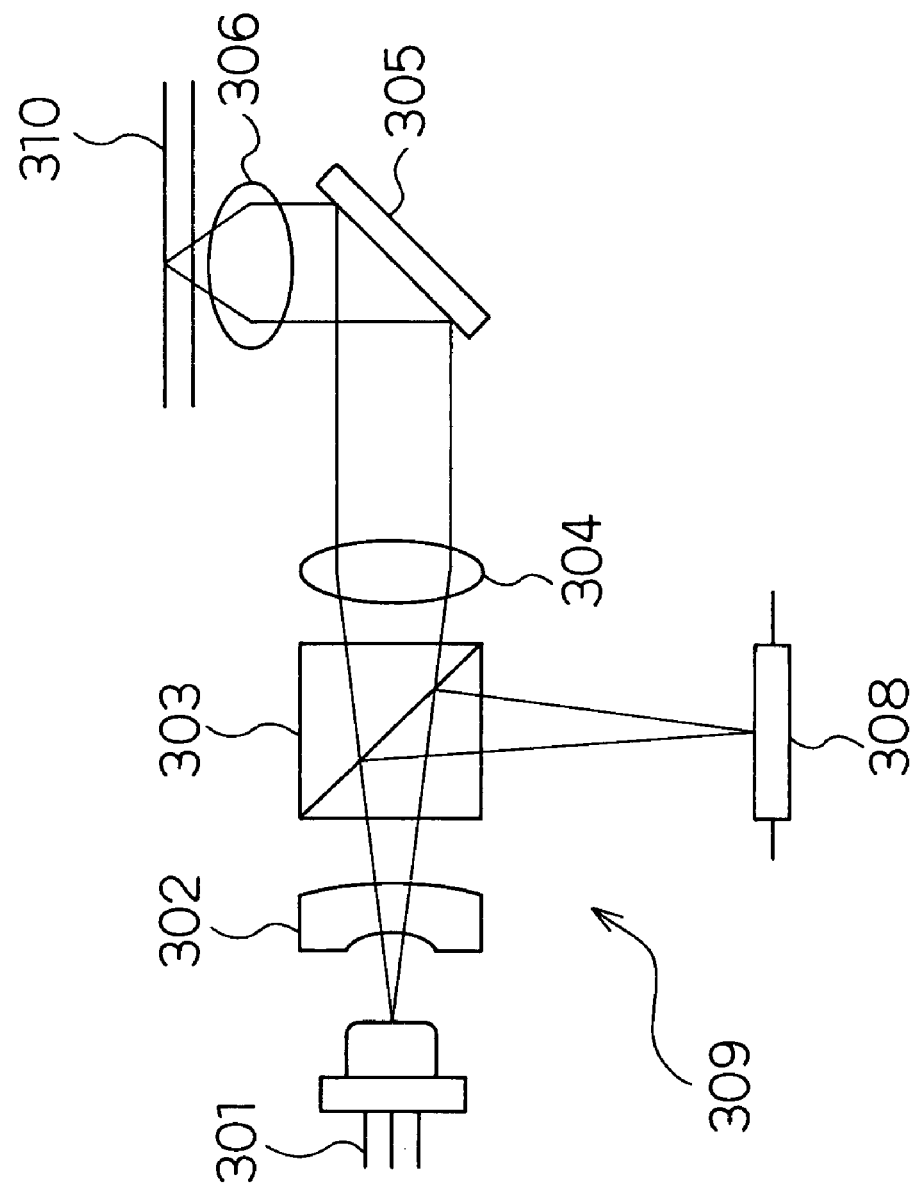
FIG. 23 is a schematic view showing the configuration of the optical head of the first conventional example.

A difference from the first conventional example previously described by referring to FIG. 23 is that the first plane 2i is the cylindrical surface of the non-circular cylindrical plane. The first conventional example had a high-order aberration of 0.06λ or more (λ is a wavelength of the beam) because the cylindrical surface of the non-circular cylindrical plane is not used. According to the first embodiment, however, it is possible, by using the cylindrical surface of the non-circular cylindrical plane, to minimize an off-axis aberration in addition to an on-axis aberration so as to hold down the high-order aberration to 0.005λ or less. Thus, it is possible to perform good recording and reproduction.

When manufacturing the beam shaping lens such as this embodiment, the cylindrical surface of the circular cylindrical plane is shaped by fixing a round bar on the body of the lens, turning the body together with the round bar and grinding a corresponding location. Such grinding is possible because the circular cylindrical plane is in a symmetrical form to a rotational axis, which facilitates profile irregularity. The cylindrical surface of the non-circular cylindrical plane is in an asymmetrical form to the rotational axis so that the shaping by means of rotation is impossible and it is difficult to work upon a lens surface with high accuracy. For such a reason, there is a tendency that the cylindrical surface of the non-circular cylindrical plane has a trace of cutting and an undulation generated thereon to deteriorate the aberration.

Thus, to satisfy aberration performance, the cylindrical surface of the non-circular cylindrical plane is required in terms of a design of the lens while the cylindrical surface of the circular cylindrical plane is required in terms of manufacturing of the lens. The first embodiment of the present invention renders the first plane 2*i* as the cylindrical surface of the non-circular cylindrical plane and renders the first plane 2*o* as the cylindrical surface of the circular cylindrical plane. Thus, it is possible, by considering both of the design and manufacturing, to implement the beam shaping lens of good aberration performance.

As the incident beam radiated from the light source 1 is diverging, an effective diameter of the beam is different at each point of the first plane 2*i* and the second plane 2*o* of which distances from the light source are different. If the first plane 2*i* as the side where a small effective diameter of the beam is obtained the cylindrical surface of the non-circular cylindrical plane and the second plane 2*o* as the side where a large effective diameter of the beam is obtained is the cylindrical surface of the circular cylindrical plane, there is an effect of minimizing influence of an error in processing lens and obtaining a better aberration characteristic.

Here, the effective diameter of the beam is different at each point of the first plane 2*i* and the second plane 2*o*. For this reason, in the case where the first plane 2*i* has larger area than the second plane 2*o* as in FIG. 3, the light radiated from the light source 1 may pass through a plane portion 2*o'* (equivalent to plane portions 210*a*, 210*b* in FIG. 2) instead of passing through the second plane 2*o* after passing through the first plane 2*i*. The light originally required is only a light 70 having passed through both the first plane 2*i* and second plane 2*o*. A light 71 having passed through the plane portion 2*o'* while passing through the first plane 2*i* goes into a range of the light 70 as the stray light or may go into an effective range of the objective lens 6 depending on the configuration so as to be a cause of lowering a quality of the beam spot.

Figure 4:
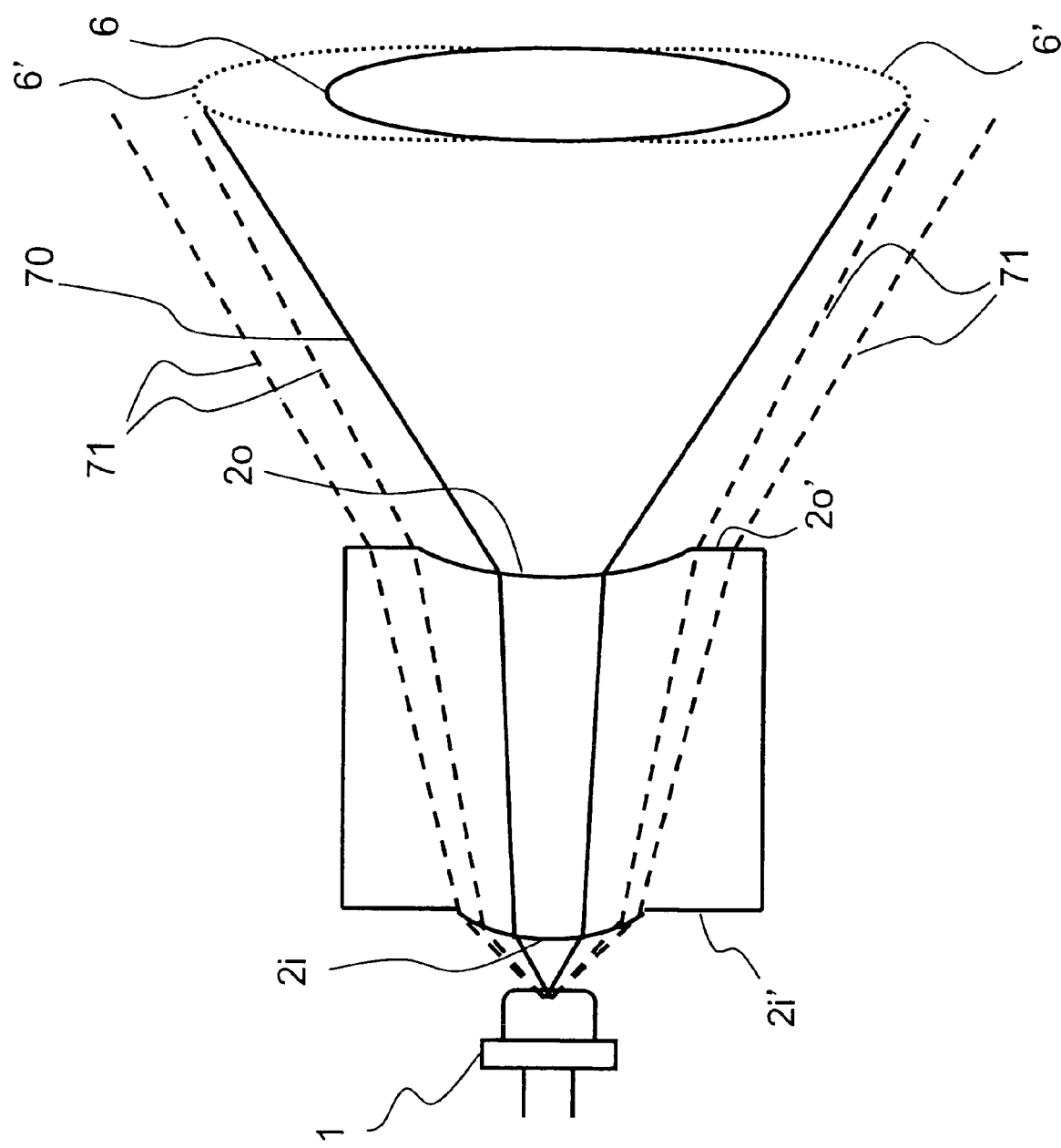
FIG. 4 is a perspective view of the beam shaping lens according to the first embodiment of the present invention.

Thus, according to the present invention, the second plane 2*o* has larger area than the first plane 2*i* as in FIG. 4. To be more precise, the distance between both ends of the generating line of the non-circular cylindrical surface forming the second plane 2*o* is larger than the distance between both ends of the generating line of the circular cylindrical surface forming the first plane 2*i*. To be more specific, the arc of the second plane 2*o* on a plane zx shown in FIG. 2 is longer than the circular arc of the first plane 2*i*.

It is thereby possible to put the stray light 71 passing through the first plane 2*i* and second plane 2*o* out of the effective diameter of the objective lens 6 for instance. It is also possible to consider a worked-on contour of the second plane 2*o* including a lens shift 6' of the objective lens 6 so as to put the stray light 71 out of this lens shift.

Figure 3:
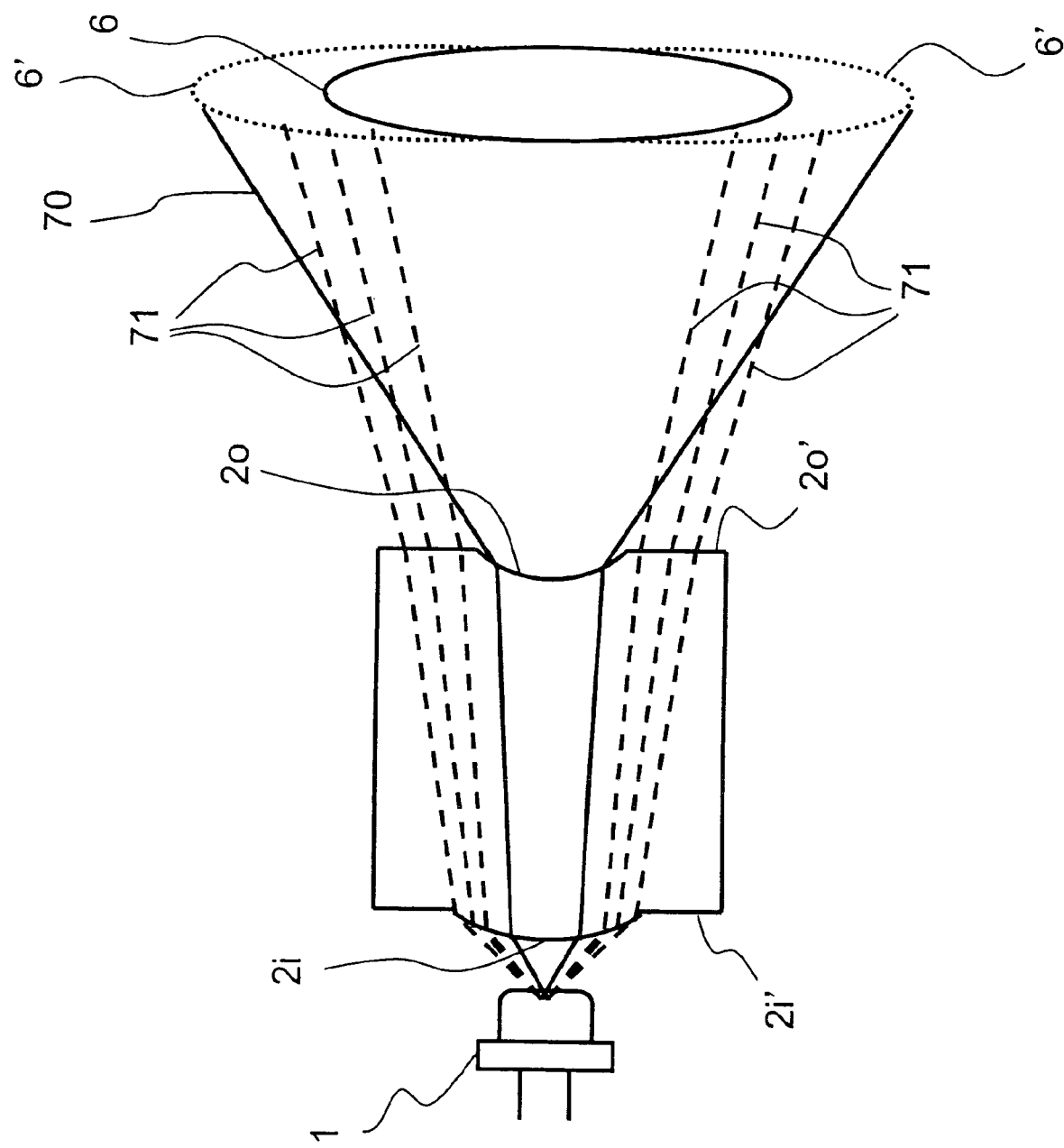
FIG. 3 is a perspective view of the beam shaping lens according to the first embodiment of the present invention.
Figure 5:
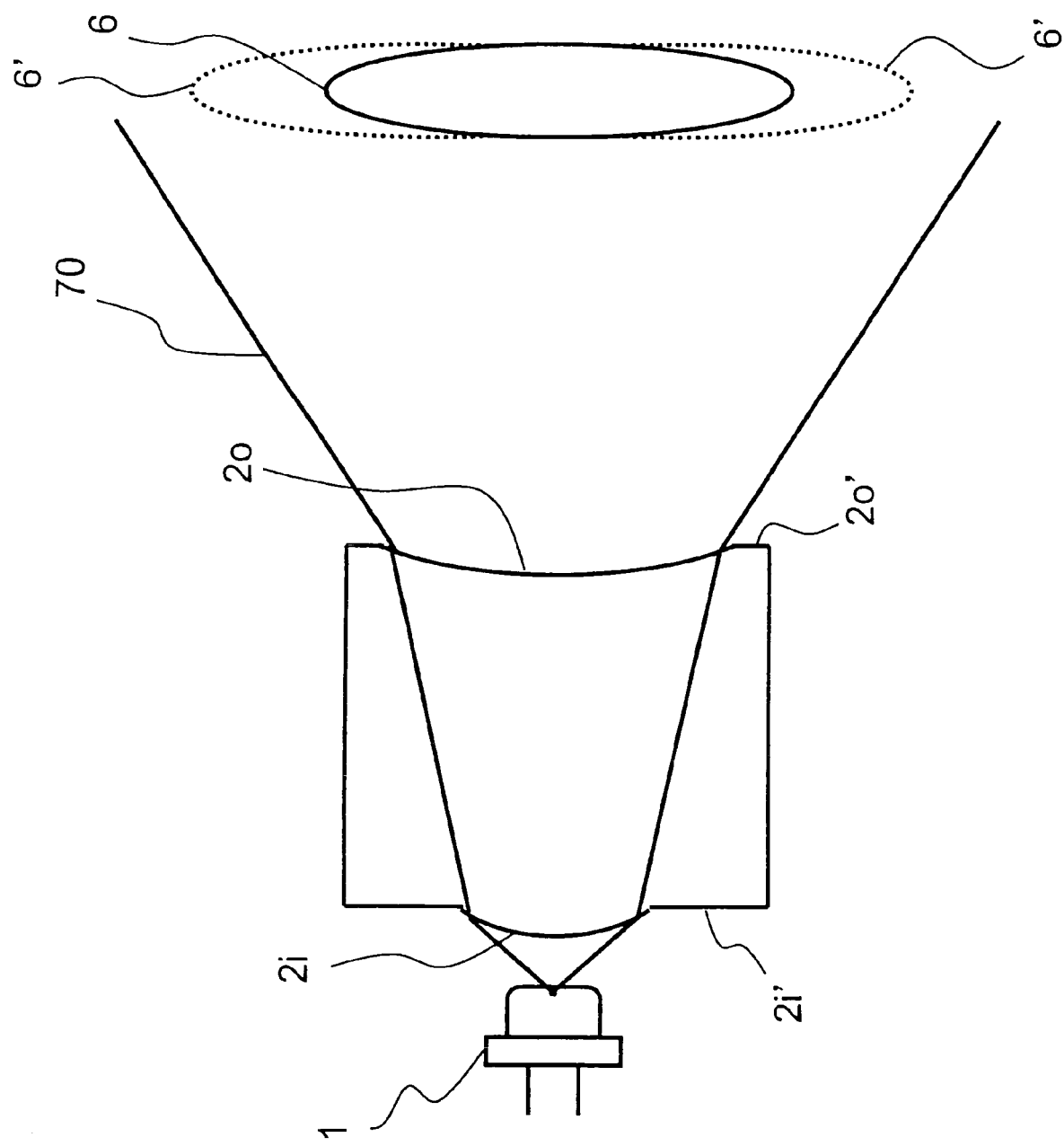
FIG. 5 is a perspective view of the beam shaping lens according to the first embodiment of the present invention.
Figure 6:
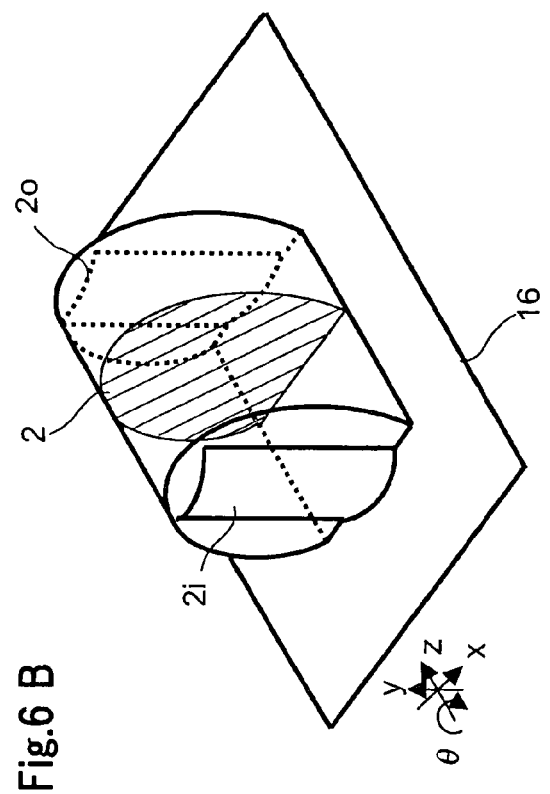
FIG. 6A is a perspective view of an example of the beam shaping lens according to the first embodiment of the present invention.
FIG. 6B is a perspective view of another example of the beam shaping lens according to the first embodiment of the present invention.
FIG. 6C is a perspective view of a further example of the beam shaping lens according to the first embodiment of the present invention.
Figure 6:
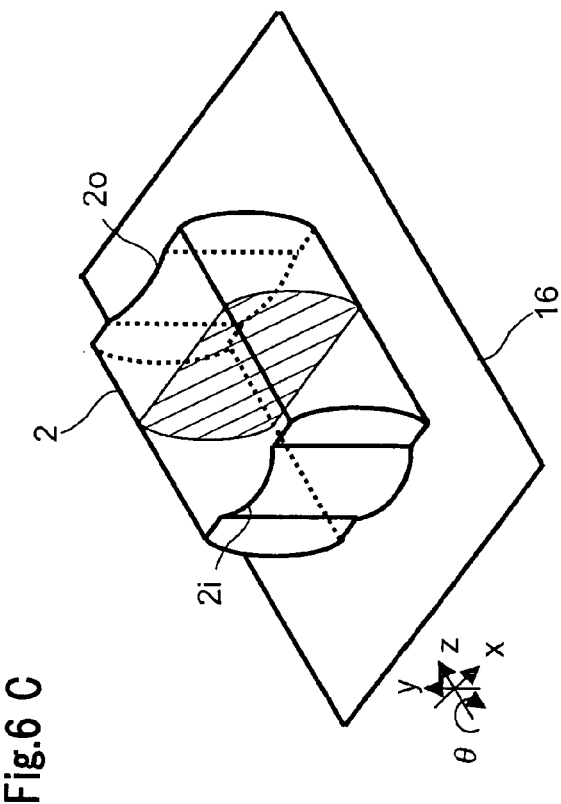
Figure 6:
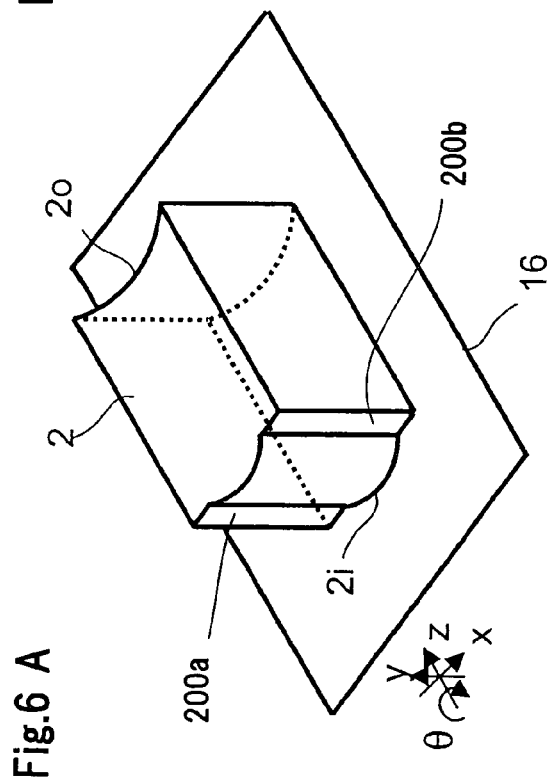
Figure 8:
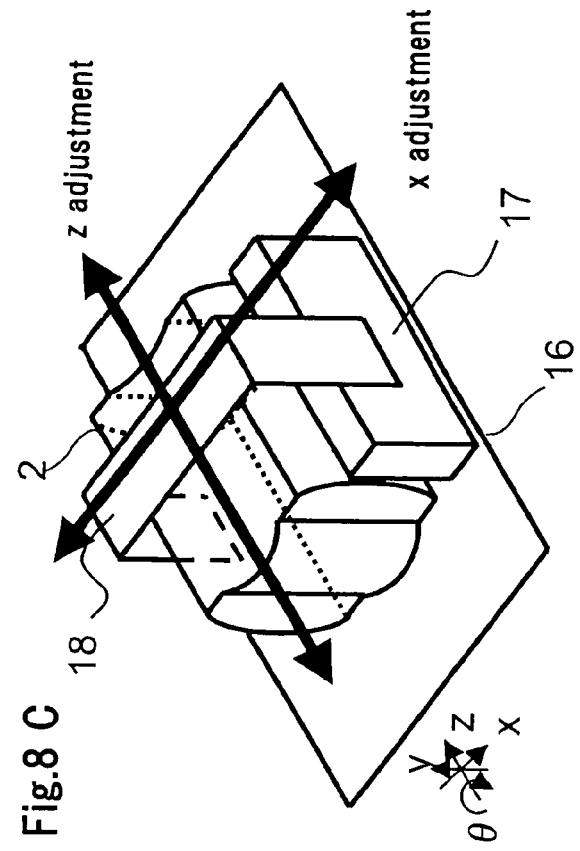
FIG. 8A is a schematic perspective view of a supporting part of the beam shaping lens according to a second embodiment of the present invention.
FIG. 8B is a schematic perspective view of the supporting part of the beam shaping lens according to the second embodiment of the present invention, 8C is a schematic perspective view of the supporting part of the beam shaping lens according to the second embodiment of the present invention, and 8D is a schematic perspective view of the supporting part of the beam shaping lens according to the second embodiment of the present invention.
Figure 8:
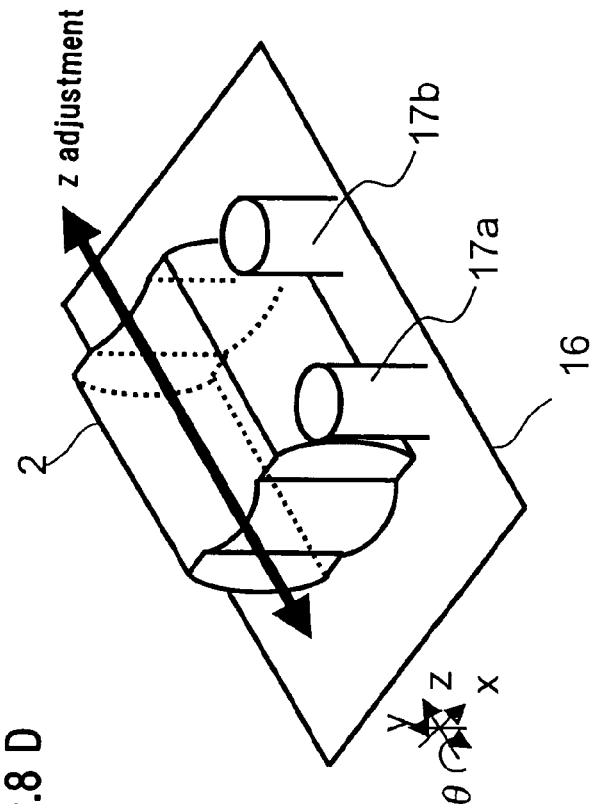
Figure 8:
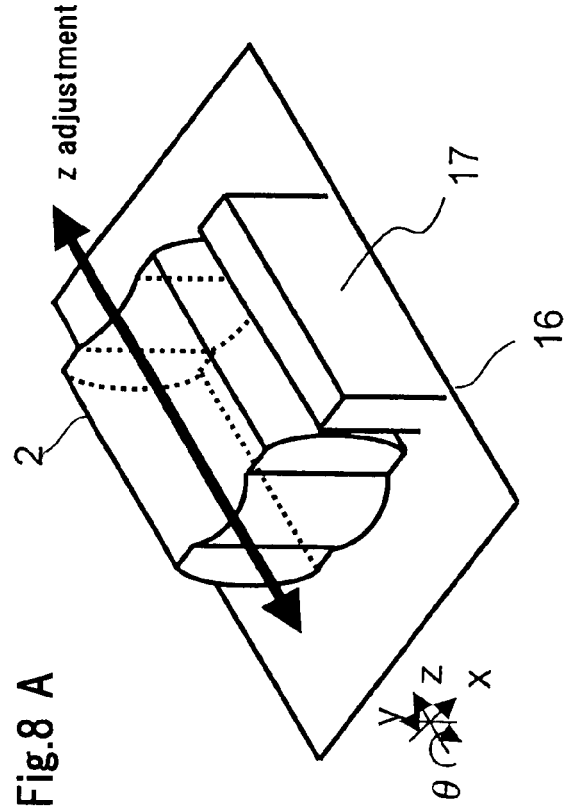
Figure 8:
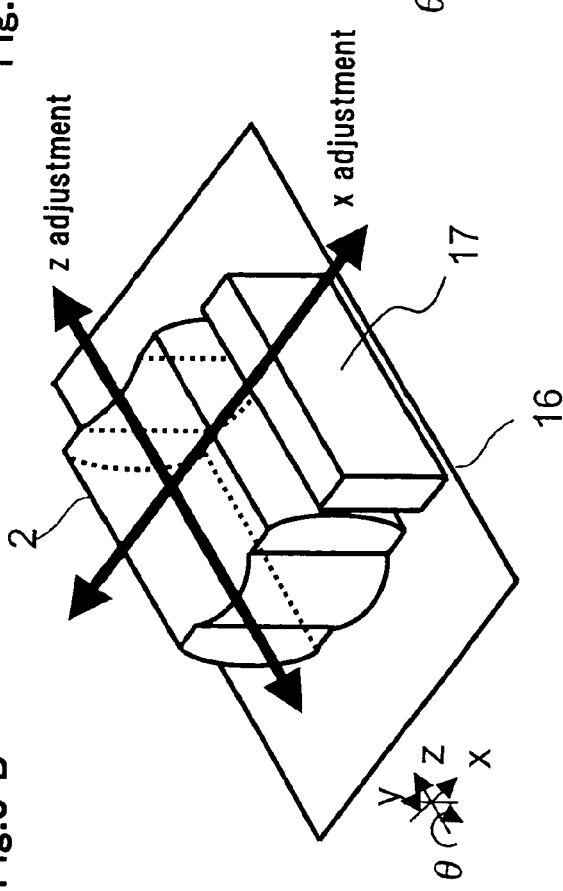
Figure 9:
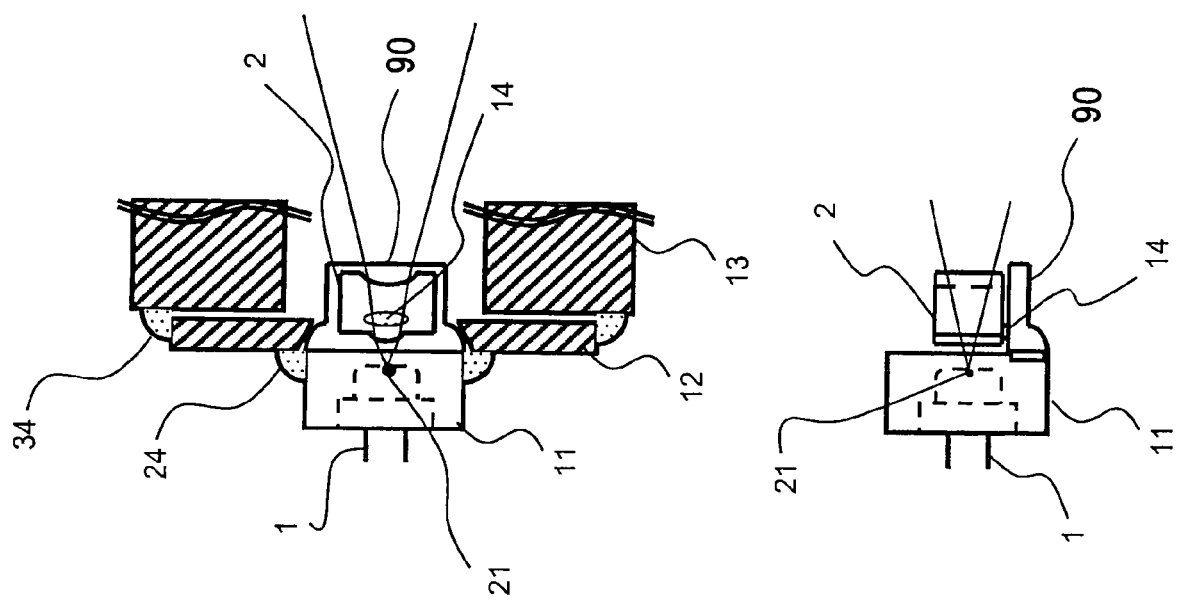
FIG. 9A is a schematic diagram of mounting of the beam shaping lens of an optical head according to the third embodiment of the present invention.
FIG. 9B is a schematic diagram of mounting of the beam shaping lens according to the third embodiment of the present invention.

It is also possible, as shown in FIG. 5, to determine the distance between the generating lines of the first plane 2*i* and the second plane 2*o* so as to have all the lights passing through the first plane 2*i* pass through the second plane 2*o*, that is, so as to intersect with all the optical paths of the incident beams refracted by the first plane 2*i* and thereby allow no stray light 71 to be completely generated. In FIGS. 3, 4 and 5, indications of components such as the branching prism 3 and collimator lens 4 are omitted for the sake of simplicity.

Figure 25:
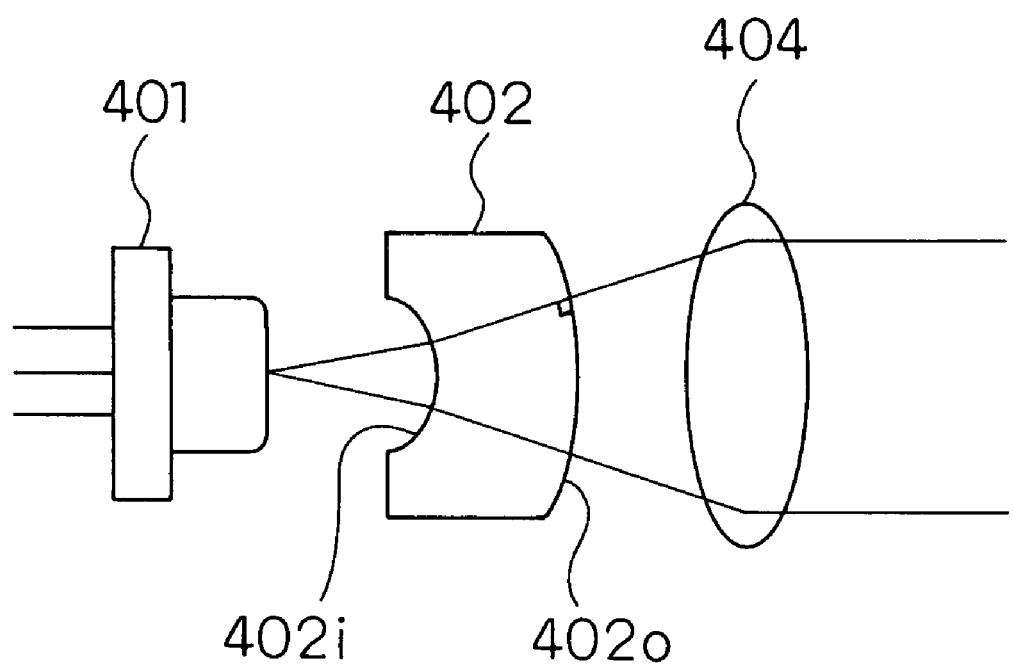
FIG. 25 is a schematic view describing the beam shaping lens of the third conventional example.

According to the third conventional example previously described by referring to FIG. 25, the first plane 402*i* is the aplanatic surface, the second plane 402*o* is the cylindrical surface of the non-circular cylindrical plane, and the distance from the luminous point of the light source 401 to the first plane 402*i* is equal to the thickness of the beam shaping lens 402. However, this embodiment is different on the following points. To be more specific, the third conventional example is designed to have no aberration generated on each of the first plane 402*i* and second plane 402*o* whereas this embodiment is designed to have no aberration generated on the first plane 2*i* and second plane 2*o* as a whole. And this embodiment does not require the distance from the light source to the first plane 2*i* to be equal to the thickness of the beam shaping lens 2.

In the case of the beam shaping lens 2 of reducing the major axis direction of the beam by rendering the first plane 2*i* as the convex surface and the second plane 2*o* as the concave surface as in this embodiment, a focal length of the collimator lens 4 of the optical head 9 can be extended. Therefore, it has an advantage of increase in allowance for movement of the luminous point due to the temperature change of the light source 1. In the case of the beam shaping of extending the minor axis direction of the beam, the first plane 2*i* should be the concave surface and the second plane 2*o* should be the convex surface. In this case, there is an advantage that the focal length of the collimator lens 4 can be shorter and so the optical head 9 becomes smaller.

Next, as shown by a shaded area of FIG. 2, the cross section form of the beam shaping lens 2 on a plane xy (the plane vertical to the optical axis A3) is square. As it is square, a bottom face 2*c* of the beam shaping lens 2 is in surface-to-surface contact with the base 16 having the beam shaping lens 2 mounted thereon so that the beam shaping lens 2 can be stably placed on a mounting plate not shown. To be more specific, it is possible to regulate rotation θ around an axis z of the beam shaping lens 2 so as to facilitate a decision on a beam shaping direction. To acquire the aberration performance, the beam shaping lens 2 needs positioning against the light source 1 in a z direction and an x direction. As the bottom face 2*c* of the beam shaping lens 2 can be in surface-to-surface contact with the base 16 described later, there is an advantage of being able to stably adjust the position.

Furthermore, FIGS. 6A to 6C show effective cross section forms for the beam shaping lens.

As in FIG. 6A, there is a possible configuration in which, to have all the lights passing through the first plane 2*i* pass through the second plane 2*o*, the second plane 2*o* is completely rid of the plane portion and is lens-edged on its entire surface so as to have no stray light whatsoever previously described generated as with the configuration shown in FIG.

5. The first plane 2*i* does not need to render its contour to be processed large, and so the plane portions 200*a*, 200*b* may remain provided on both ends thereof. In particular, in the case of forming the second plane 2*o* with the non-circular cylindrical plane, it is disadvantageous to render its contour to be processed large. In the case of this embodiment, however, the second plane 2*o* is formed with the circular cylindrical plane, and so the manufacturing is not difficult. It is also possible to place an aperture of blocking only the stray light 71 behind the beam shaping lens 2 viewed from the light source 1, that is, on a front side of the second plane 2*o*.

A configuration example shown in FIG. 6B has the cross section form of the beam shaping lens 2 rendered as a deformed circular form of which perimeter is partially linear as shown in the shaded area therein. Such a beam shaping lens 2 has its bottom face portion comprised of straight lines as a flat surface in contact with the base 16. The contours of the other portions are basically cylindrical. Such a form can be created by forming a cylindrical portion once and then cutting a part of the cylindrical surface to form a flat portion. Therefore, it has advantages that it can be easily created, and the rotation θ around the axis z can be regulated by providing the flat surface so as to facilitate a decision of the beam shaping direction. As for creation of the flat portion, it may be created simultaneously with the cylindrical portion in a process of injection by providing a location corresponding to the flat portion on a mold for forming of the beam shaping lens body.

Next, the configuration example shown in FIG. 6C has the cross section form of the beam shaping lens to which a new linear portion is provided to be opposed to the linear portion in the form shown in FIG. 6B as indicated by the shaded area therein. Thus, the body of the beam shaping lens 2 has a pair of flat surfaces provided symmetrically to the optical axis of the beam, and has an advantage of easily enhancing a relative angle accuracy in a θ direction of the first plane 2*i* and second plane 2*o* which are two cylindrical surfaces. In this case, it is also possible to cut a part of a cylindrically formed object flatly even if there are two flat portions created on the mold for forming. The form shown in FIG. 6C has the flat surfaces provided symmetrically (the two linear portions are configured in parallel in the cross section form), and has an advantage of being usable without being conscious of two sides of the front and back of the beam shaping lens 2. However, the flat portions do not always have to be provided at symmetrical positions. As for FIGS. 6B and 6C, it was described that the portions other than the linear portions of the cross section form were circular. However, they may also be elliptic. If there are the linear portions in part, it only has to be a perimeter comprised of arbitrary curves which can be substantially approximated as a circle or an ellipse.

Next, it is possible to apply a UV cure adhesive 14 between the bottom face 2*c* of the beam shaping lens 2 and the base 16 so as to irradiate ultraviolet ray after adjusting the positioning of the beam shaping lens 2 and thereby fix the beam shaping lens 2 easily. In general, the adhesive gets swollen or contracts due to the temperature change. As shown in FIG. 2, the adhesive 14 applied to the plane xz (the plane vertical to central axes A1 and A2 of the cylindrical surface) expands and contracts evenly in the x direction and z direction due to the temperature change so as not to cause the beam shaping lens 2 to move in the x direction and z direction. However, the adhesive 14 expands and contracts in the y direction due to the temperature change so as to cause the beam shaping lens 2 to move in the y direction. Nevertheless, no change occurs to optical characteristics because only the first plane 2*i* and second plane 2*o* move in the y direction. Thus, the first embodiment of the present invention has an advantageous merit that the optical characteristics are not deteriorated by environmental variation such as the temperature change.

As the optical bench such as the base 16 of mounting optical components is made of a metal and a resin, it gets swollen or contracts due to the temperature change. Along with it, the distance between the light source 1 and the beam shaping lens 2 varies and the astigmatism arises. According to the first embodiment of the present invention, the fixed position of the beam shaping lens 2 by the adhesive 14 is closer to the light source 1 side (closer to the first plane 2*i*) than the center as shown in FIG. 2. Thus, the distance between the light source 1 and the fixed position of the beam shaping lens 2 is rendered shorter so that the base 16 gets swollen or contracts less due to the temperature change. Consequently, as an obtained effect, the change in the distance between the light source 1 and the fixed position of the beam shaping lens 2 is smaller compared to the case of rendering the fixed position closer to the second plane 2*o* than the center so that the variation in the astigmatism also becomes smaller.

In the case where the light source 1 emits a blue laser, the beam shaping lens 2 is comprised of glass, and the base 16 is comprised of metals such as aluminum and zinc, the distance between the luminous point of the light source 1 and the first plane 2*i* should desirably be 1 mm to 2 mm.

As shown in FIG. 7A, it is also possible to fix the beam shaping lens 2 by elastically pushing it down with a spring 15 along the y direction (central axis direction of the cylindrical surface). If only pushed along the y direction, the beam shaping lens 2 does not move in the x direction and z direction even when the base 16 gets swollen or contracts due to the temperature change. And, the first embodiment of the present invention has an advantageous effect that, even if the beam shaping lens 2 moves in the y direction, no change occurs to optical characteristics because only the first plane 2*i* and second plane 2*o* move in the y direction. In this case, it is also possible to render the position of pushing with the spring 15 closer to the light source 1 side than the center so as to obtain the effect that the variation in the astigmatism becomes smaller.

Next, a description will be given by referring to FIGS. 7B and 7C as to an embodiment of placing the fixed position of the beam shaping lens 2 so that increase in the astigmatism becomes less as against the temperature change.

FIG. 7B is a schematic diagram of another spring holder of the beam shaping lens according to the first embodiment. It is possible to apply the adhesive 14 of joining the base 16 to the beam shaping lens 2 only on the side close to the light source 1 of the beam shaping lens 2 and thereby place the fixed position on the side close to the light source 1 of the beam shaping lens 2 so as to obtain the effect of rendering the variation in the astigmatism smaller. Furthermore, it is possible, by pushing down the side close to the light source 1 of the beam shaping lens 2 with the spring 15, to hold down the increase in the astigmatism more stably and without variations.

FIG. 7C is a schematic diagram of another base 16A of mounting the beam shaping lens thereon according to the first embodiment. The base 16A has a difference in level, and is in a convex form against the beam shaping lens 2 on the side close to the light source 1. The adhesive 14 of joining the base 16A to the beam shaping lens 2 is applied to the portion in the convex form, that is, the surface of which difference in level is higher. If the base 16A is thus in the convex form against the beam shaping lens 2, a contact surface between the beam shaping lens 2 and the base 16A can be rendered smaller. A posterior half of the beam shaping lens 2 (viewed from the light source 1) including the second plane 2*o* does not contact the base 16A directly so as not to be influenced by contraction of the base 16A due to the temperature change. Thus, it is possible to hold down the increase in the astigmatism more stably and without variations.

FIG. 7D is a schematic diagram of a further base of mounting the beam shaping lens according to the first embodiment thereof. A base 16B has a concave form such as a groove 16C for instance against the beam shaping lens 2 between the fixed position of the base 16B on the side close to the light source 1 and the second plane 2o on the remote side. If the base 16B is thus configured, this groove 16C can stabilize a fixed angle of the beam shaping lens 2 around the axis x and hold down the increase in the astigmatism without variations. In the case of fixing the base 16A and the beam shaping lens 2 with the adhesive, the adhesive 14 should be applied to the fixed position of the base 16B on the side close to the light source 1. The groove 16C is shown as orthogonal to the axis z in the drawing. However, it may just intersect therewith at an arbitrary angle.

In both the examples shown in FIGS. 7C and 7D, it is possible, as previously described by referring to FIG. 7B, to hold down the increase in the astigmatism more stably and without variations by pushing down the side close to the light source 1 of the beam shaping lens 2 with the spring 15.

The beam shaping lens 2 is made of glass according to the first embodiment of the present invention. The beam shaping lens 2 itself expands and contracts due to the temperature change and the astigmatism arises. The glass has an advantage that its coefficient of thermal expansion is lower than that of the resin and so the variation in the aberration due to temperature change can be held down to be small.

According to the first embodiment, the first plane 2i of the beam shaping lens 2 is corresponding to the plane of incidence of the present invention and second plane 2o is corresponding to the outgoing plane of the present invention respectively. The plane portions 200a and 200b are corresponding to the pair of plane portions provided as if sandwiching the plane of incidence of the present invention, and the plane portions 210a and 210b are equivalent to the pair of plane portions provided as if sandwiching the outgoing plane of the present invention. The base 16 is corresponding to the mounting plate of the present invention. Unless specifically described, these correspondences are maintained in the following embodiments.

However, the present invention is not limited to the configuration. It was described that the first plane 2i is curving convexly against the light source while the second plane 2o is curving concavely against it. The present invention may also have the configuration in which the plane of incidence is curving concavely while the outgoing plane is curving convexly. In this case, it is similar to the conventional example shown in FIG. 25 at a glance. However, the present invention comprises the plane of incidence having the non-circular cylindrical surface and the outgoing plane having the circular cylindrical surface. The effects thereof can be obtained by maintaining the combination of the curves on each plane, and are not limited by the direction of the curves in that combination.

Second Embodiment

FIGS. 8A to 8C show a second embodiment of the present invention. They show the light source 1, beam shaping lens 2 and peripheral components thereof, and the others are omitted because they are the same as those in the first embodiment.

The beam shaping lens 2 described in this embodiment can have all the contents indicated in the first embodiment applied thereto.

The beam shaping lens 2 generates the astigmatism in the case where it deviates back and forth in the axis z direction from a design situation, that is, in parallel with the optical axis. By using this inversely, it is possible for the optical head 9, as well known, to have the configuration in which, as to the astigmatism originally held by the mirror 5 and objective lens 6 on manufacturing for instance, the beam shaping lens 2 is rendered movable back and forth on assembling the head and the light is thereby emitted from the objective lens 6 so that a spot on the optical disk 10 will have no astigmatism.

Here, the beam shaping lens 2 is exactly adjusted at a position having the inclination of the light from the light source 1 corrected. If the beam shaping lens 2 deviates in the axis x direction here, it inclines the optical axis which is exactly adjusted.

Here, as shown in FIG. 8A, a supporting part 17 contacting the beam shaping lens 2 is provided on the base 16. The supporting part 17 is a plate-like member provided integrally on the base 16. It is formed by working on it by etching and so on in the case where the base 16 is metallic. It is integrally shaped with a mold in the case where the base 16 is a resin.

The supporting part 17 is in contact with the beam shaping lens by a line or a plane parallel with the axis z on the plane xz in FIG. 8A, or two or more points on a plane parallel therewith. These contacting locations are placed in a row at the positions substantially parallel with the optical axis. In FIG. 8A, the sides of the beam shaping lens 2 are in a cylindrical form while the supporting part 17 is the plate-like member. Therefore, they are in contact along the line parallel with the axis z.

Such a supporting part 17 regulates the beam shaping lens 2 so as not to move on the plane zx in the direction intersecting with the axis x. Thus, the beam shaping lens 2 is placed at a position not inclining the optical axis without adjusting the axis x. Therefore, the beam shaping lens 2 has an advantage that, even if the position is adjusted back and forth, that is, in the axis z direction along the supporting part 17, no deviation occurs in the axis x direction and the aforementioned astigmatism adjustment can be implemented without inclining the optical axis.

As shown in FIG. 8B, the base 16 and the supporting part 17 may be configured as separate members. In this case, there is an advantage that the x adjustment can be made by simultaneously holding the beam shaping lens 2 and the supporting part 17 and the aforementioned astigmatism adjustment is possible while implementing an exact x axis adjustment.

Next, FIG. 8C shows a configuration example in which a supporting spring 18 is further provided on the supporting part 17. The supporting spring is provided in parallel with the axis x, and its elastic force works in the axis x direction so as to regulate the moving direction of the beam shaping lens 2. The supporting spring 18 allows the beam shaping lens 2 to constantly implement a state of contacting the supporting part 17. It has the effect of more exactly keeping the beam shaping lens from deviating in the axis x direction on the aforementioned astigmatism adjustment.

The supporting part 17 and supporting spring 18 can have the same effect whether comprised of the same members or different members.

Furthermore, as for the examples shown in FIGS. 8A to 8C, it is also possible to remove the supporting part 17 and supporting spring 18 from the base 16 after completing the axis x adjustment and fixing the beam shaping lens 2 at an appropriate fixed position as previously described. In this case, it contributes to lighter weight of the optical head.

In the configuration, the bases 16A and 16B are corresponding to the mounting plate of the present invention as with the base 16, and the supporting part 17 is corresponding to the lens supporting means of the present invention. The supporting spring 18 is the means of providing the elastic force of the present invention.

However, the present invention is not limited by the embodiments. For instance, the supporting part 17 may be implemented as multiple rod-like members 17a and 17b as shown in FIG. 8D. In this case, the rod-like members 17a and 17b point-contact the beam shaping lens 2 respectively. Contact points are placed in a row in the direction parallel with the axis z so as to regulate the movement of the beam shaping lens 2 in the axis x direction. The supporting spring 18 is shown as a plate spring in the drawing. However, it is not limited to the concrete example as long as it is the means capable of exerting the elastic force vertically on the beam shaping lens 2 from an upper portion thereof to a fixed location (axis y direction in the drawings) so as to fix the beam shaping lens 2.

Third Embodiment

FIGS. 9A and 9B show a third embodiment of the present invention. They show the light source 1, beam shaping lens 2 and their peripheral components, and the others are omitted because they are the same as those in the first and second embodiments. Details of the beam shaping lens 2 are as described in the first and second embodiments.

In general, the light source 1 has a deviation of a luminous point 21 of approximately 0.1 mm and an optical axis inclination of approximately 3 degrees due to manufacturing errors. To correct them, it is necessary to perform positioning and windage adjustment of the light source 1. As shown in FIG. 9A, the light source 1 is fixed on a holder 11 by press-fitting or swaging. The holder 11 is capable of performing the windage adjustment to an adjustment plate 12 in order to correct optical axis inclination of the light source 1. The adjustment plate 12 is capable of the positioning against an optical bench 13 having the optical components mounted thereon in order to correct the deviation of the luminous point 21 of the light source 1. After the windage adjustment and positioning of the light source 1, the holder 11, adjustment plate 12 and optical bench 13 are fixed with an adhesive 24 and an adhesive 34. Also the holder 11 is a component which is integrate formed with a mounting body 90 of mounting the beam shaping lens 2.

FIG. 9B shows a side view of the holder 11. It is necessary to adjust a positional relation between the light source 1 and a beam shaping lens 22 exactly. And it is preferable that variations in the positions be minor even if the temperature change arises after the adjustment. There is a problem that if the light source 1 and beam shaping lens 22 are held by different holders respectively and joined, the distance between the holders is apt to change due to the temperature change. The third embodiment of the present invention has the beam shaping lens 22 and the light source 1 mounted on the holder 11 which is a single member. Therefore, its configuration is simple so that there is an effect that variation in a positional relation is minor against the environmental variation and a good aberration characteristic can be maintained.

Figure 10:
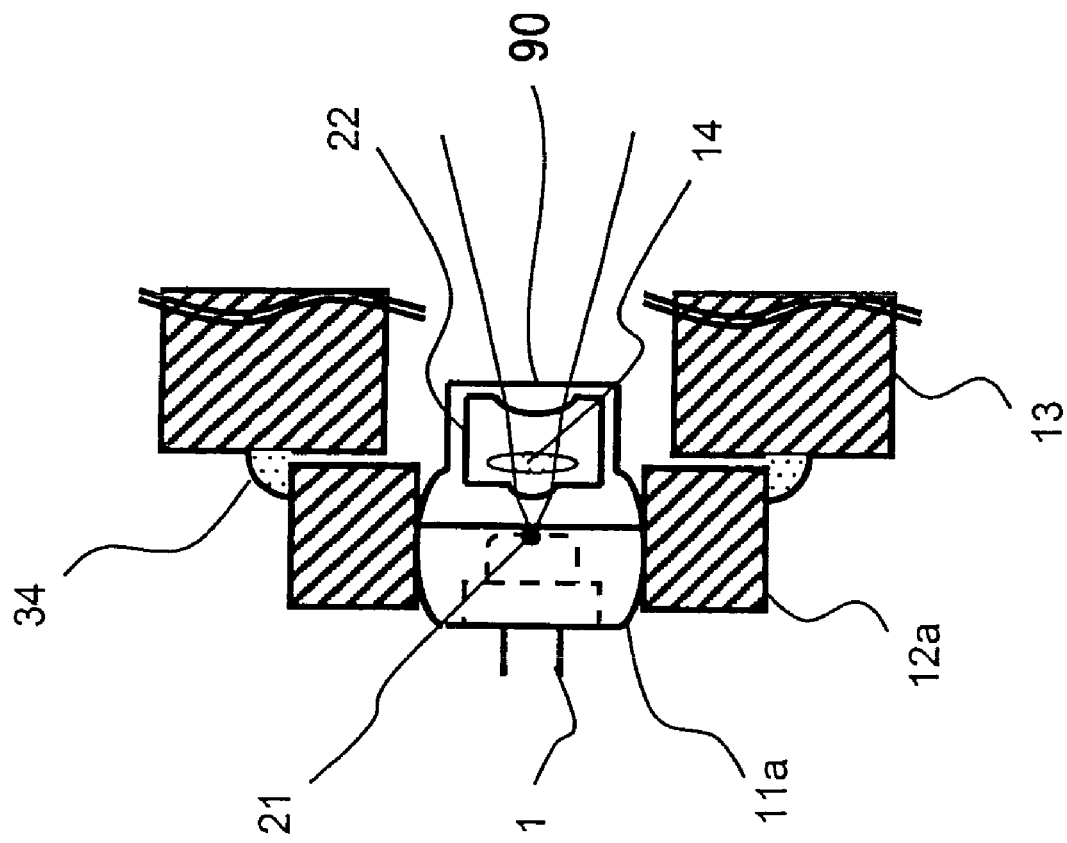
FIG. 10 is a schematic diagram of mounting of the beam shaping lens according to the third embodiment of the present invention.

FIG. 10 shows the case where a holder 11a having the light source 1 and beam shaping lens 2 mounted thereon is press-fitted into an adjustment plate 12a after the windage adjustment. Because of a windage adjustment structure, the adhesive 24 of FIG. 9A goes into a clearance between the holder 11 and the adjustment plate 12 and expands and contracts due to the temperature change so that it is apt to vary the position of the luminous point 21. As in FIG. 10, it is possible to eliminate the influence of the expansion and contraction of the adhesive by press-fitting so as to maintain more stable performance. It can also be implemented by the swaging or welding instead of press-fitting.

Figure 11:
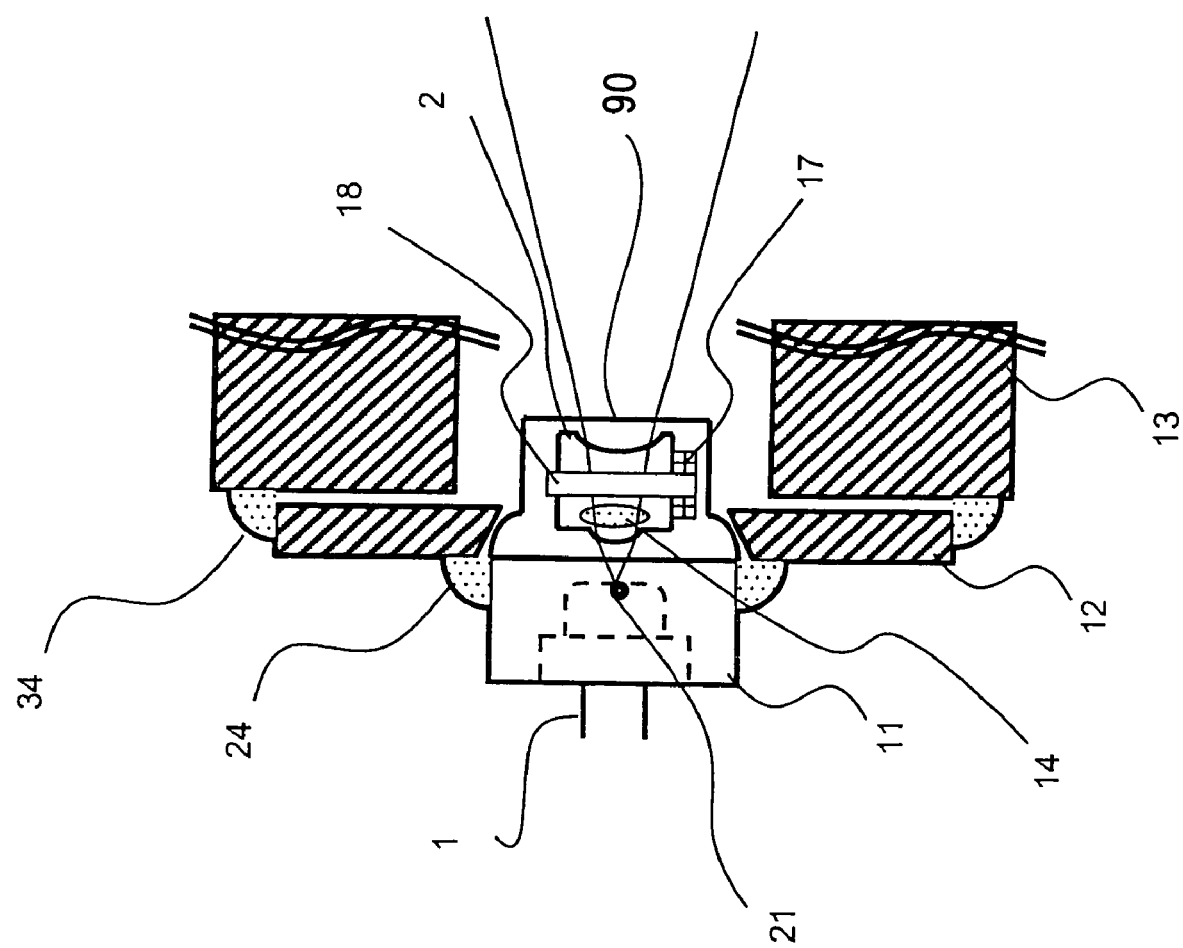
FIG. 11 is a schematic diagram of mounting of the beam shaping lens according to the third embodiment of the present invention.

As shown in FIG. 11, according to the third embodiment of the present invention, all the effects described in the second embodiment can also be obtained by adding the supporting part 17 and supporting spring 18 described in the second embodiment on the mounting body 90 and providing a difference in level and a groove not shown. As the mounting body 90 has the beam shaping lens 2 mounted on its top surface, it is possible to apply the characteristics of the bases 16, 16A and 16B of the second embodiment as-is. In this case, the mounting body 90 constitutes the mounting plate of the present invention as with the base 16. Although in the above-mentioned embodiment, the holder 11 and the mounting body 90 are explained to be one integrated component, there are separate components each other.

The holder 11 and the beam shaping lens 2 shown in FIGS. 8A to 8D and FIGS. 9 to 11 of the second embodiment are corresponding to the lens part of the present invention.

Fourth Embodiment

Figure 13:
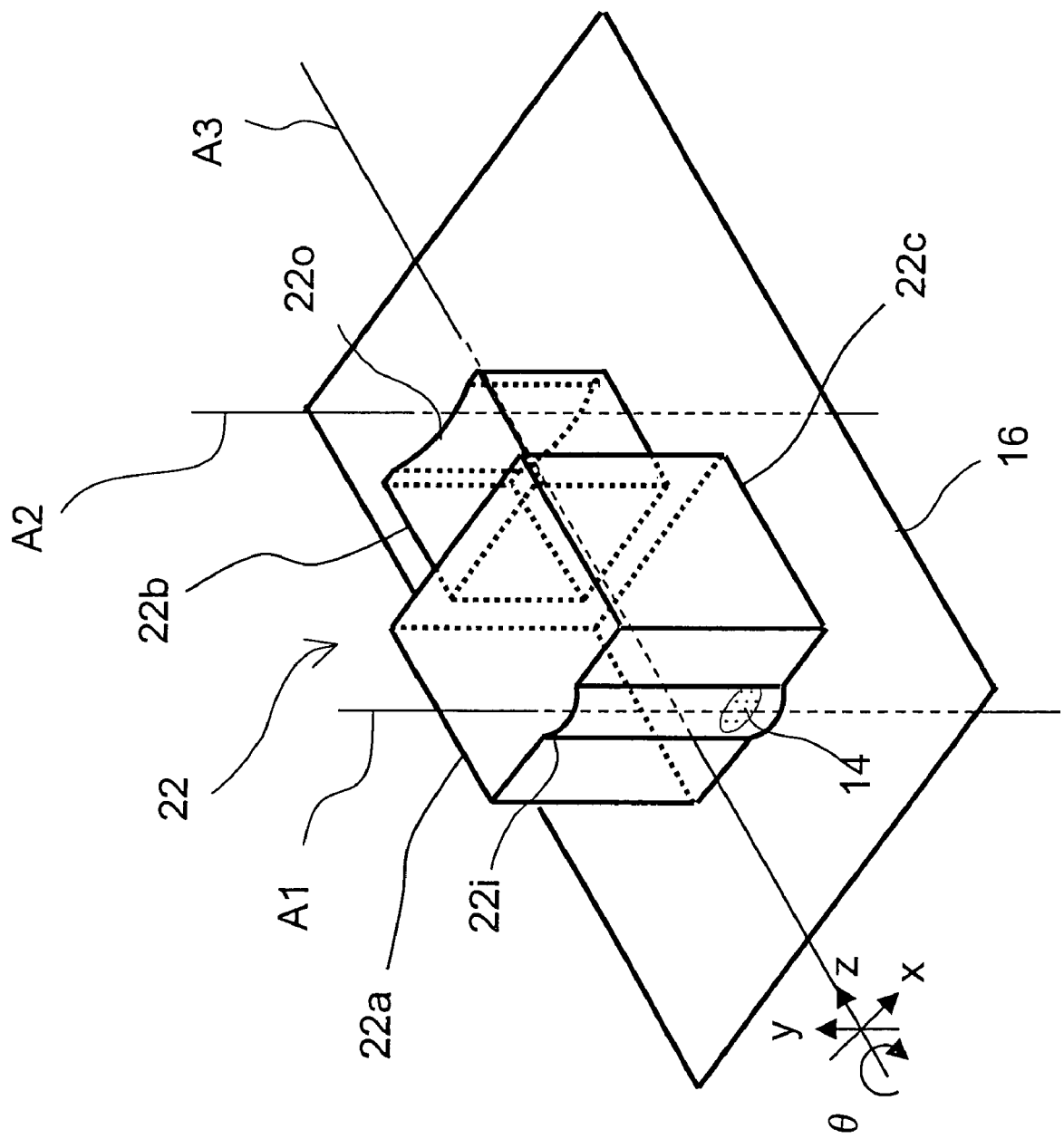
FIG. 13 is a perspective view of the beam shaping lens according to the fourth embodiment of the present invention.

FIGS. 12A and 12B show an optical head 29 of a fourth embodiment of the present invention. A difference from the first embodiment is that the beam shaping lens 22 is comprised of a lens 22a having only a first plane 22i (corresponding to a first plane 2i) as an acceptance surface of the incident beam from the light source and a lens 22b having only a second plane 22o (corresponding to a second surface 20) as an acceptance surface of an outgoing beam to the objective lens side. And the others are omitted because they are the same as those in the first embodiment. FIG. 13 shows a perspective view of the beam shaping lens 22.

Conventionally, axial rotation symmetry was performed in lens manufacturing, and so a rotational adjustment of the two sides of the front and back of the lens (incident side and outgoing side of the beam) was not necessary. In the case of the lens which is not the axial rotation symmetry such as the beam shaping lens 2 of the first embodiment, however, it is necessary to pay attention to a rotational error of the two sides of the front and back thereof. If the beam shaping magnification becomes twice or so, a large aberration is generated due to the rotational error. For that reason, the rotational allowable error is as tight as 0.05 degrees or less. The second embodiment has the configuration in which the beam shaping lens 22 is divided into two as the lens 22a and lens 22b.

As the beam shaping lens 22 is divided into two, it becomes necessary, for the sake of rendering the respective central axes A1 and A2 of a first plane 22i and a second plane 22o parallel and intersecting with the optical axis A3, to measure a wave surface with an interferometer and perform the positioning of the lens 22a and lens 22b along the x direction and rotational adjustment in the θ direction. The positioning and rotational adjustment become easier by rendering a joint surface as a plane. If the sizes of the lens 22a and lens 22b are mutually different as shown in FIG. 13, the lens will not be unstably fixed on the base 16 even if joined in a little deviated state on the positioning and rotational adjustment. As will be described later, it is preferable to render the cylindrical lens 22a on the light source 1 side larger than the cylindrical lens 22b. However, the lens 22a should be larger than the lens 22b only in the contour. As for the area of the cylindrical surfaces, it is preferable that a relationship of the plane of incidence 22i and the outgoing plane 22i is the same as that of the plane of incidence 2i and the outgoing 2i in the first embodiment.

It is possible, by rendering the cross section form of the lens 22a on the plane xy square, to put a bottom face 22c of the lens 22a in surface-to-surface contact with the base 16 so that the beam shaping lens 22 can be stably placed. To be more specific, it is possible to regulate the rotation θ around the axis z of the beam shaping lens 22 so as to facilitate the decision on the beam shaping direction.

The beam shaping lens 22 requires the positioning in the z direction and x direction against the light source 1 in order to obtain desired aberration performance. As the bottom face 22c of the lens 22a is in surface-to-surface contact with the base 16, there is the advantage of being able to stably adjust the position. The area of the bottom face 22c increases by rendering thickness of the lens 22a larger in the z direction so that it has the effect of performing the positioning of the beam shaping lens 22 more stably.

It is also be implemented likewise by making the cross section form of the lens 22a in a circular form and making the plane portion (bottom face 22c) by cutting.

Once the UV cure adhesive 14 is applied between the bottom face 22c and the base 16, it is possible to easily fix the beam shaping lens 22 by irradiating the ultraviolet after the positioning of the beam shaping lens 22. In general, the adhesive gets swollen or contracts due to the temperature change. As shown in FIG. 7, the adhesive 14 applied to the plane xz (the plane vertical to central axes of the plane of incidence and outgoing plane) expands and contracts evenly in the x direction and z direction due to the temperature change so as not to cause the beam shaping lens 22 to move in the x direction and z direction. However, the adhesive 14 expands and contracts in the y direction due to the temperature change so as to cause the beam shaping lens 22 to move in the y direction. Nevertheless, no change occurs to the optical characteristics because only the first plane 2i and second plane 2o move in the y direction. Thus, the second embodiment of the present invention has an advantageous merit that the optical characteristics are not deteriorated by environmental variation such as the temperature change.

As the optical bench of mounting the optical components is made of a metal and a resin, it gets swollen or contracts due to the temperature change. Along with it, the distance between the light source 1 and the beam shaping lens 22 varies and the astigmatism arises. According to the second embodiment of the present invention, the contour of the cylindrical lens 22a on the light source 1 side is larger, and so the fixed position of the beam shaping lens 22 by the adhesive 14 can be on the light source 1 side (closer to the first plane 2i). Thus, the distance between the light source 1 and the fixed position of the beam shaping lens 22 is rendered shorter so that, as an obtained effect, the contraction against the temperature change is smaller and consequently, the variation in the astigmatism also becomes smaller.

Figure 14:
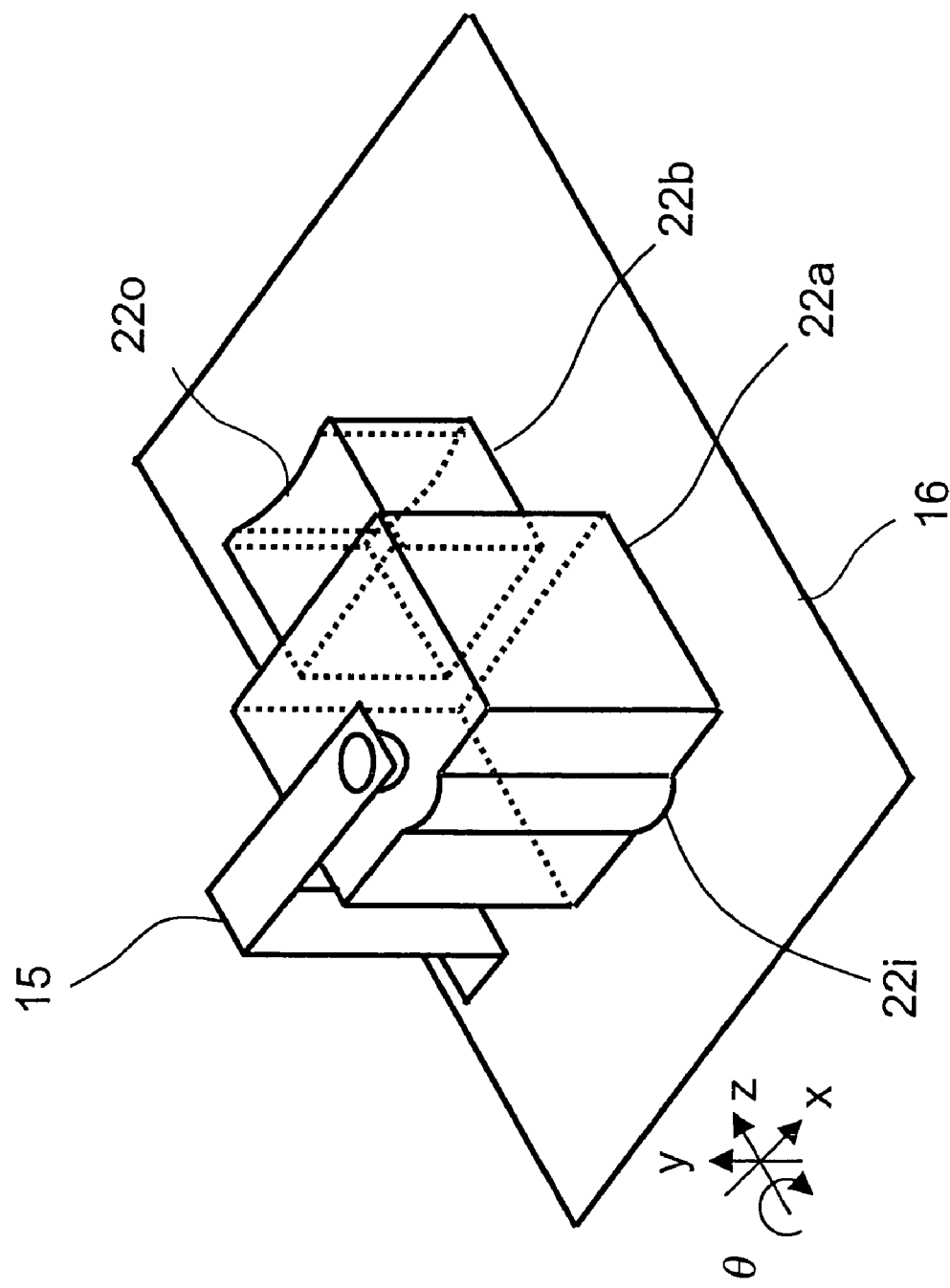
FIG. 14 is a schematic perspective view of a spring holder of the beam shaping lens according to the fourth embodiment of the present invention.

As shown in FIG. 14, it is also possible to fix the lens 22a by pushing it down with the spring 15 in the y direction (the direction of central axis of the first plane 22i). If only pushed in the y direction, the beam shaping lens 22 does not move in the x direction and z direction even when the base 16 expands and contracts due to the temperature change. And there is an advantageous effect that, even if the beam shaping lens 22 moves in the y direction, no change occurs to optical characteristics because only the first plane 22i and second plane 22o move in the y direction. In this case, it is also possible to render the position of pushing the beam shaping lens 22 with the spring 15 closer to the light source 1 side so as to obtain the effect that the variation in the astigmatism becomes smaller.

The lens 22a and lens 22b are made of glass according to the third embodiment of the present invention. The beam shaping lens 22 itself expands and contracts due to the temperature change and the astigmatism arises. The glass has the coefficient of thermal expansion which is lower than that of the resin, and so the variation in the aberration due to temperature change can be held down to be small.

Figure 15:
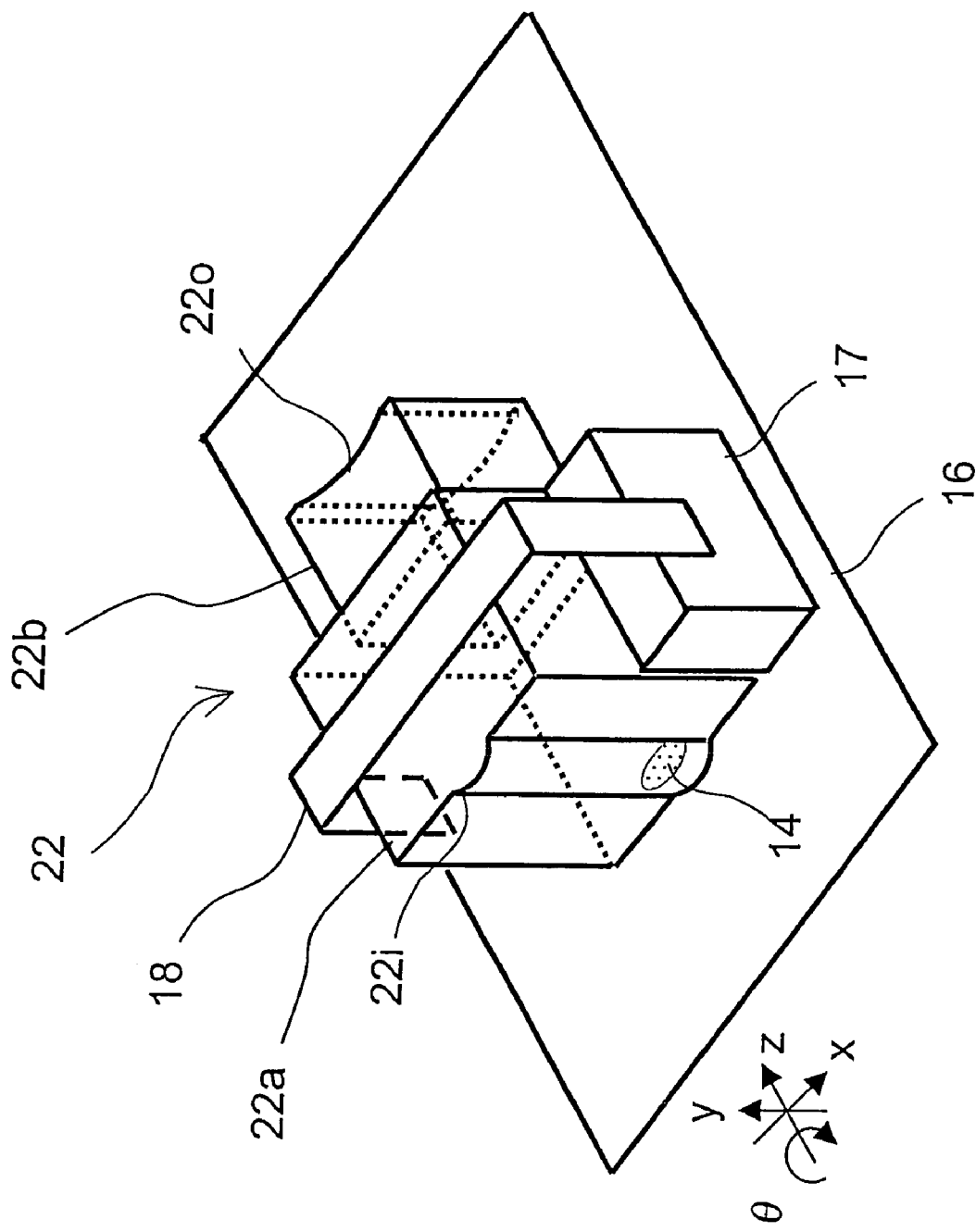
FIG. 15 is a schematic perspective view of a supporting part of the beam shaping lens according to the fourth embodiment of the present invention.

As shown in FIG. 15, according to the fourth embodiment of the present invention, all the effects described in the second embodiment can also be obtained by adding the supporting part 17 and supporting spring 18 described in the second embodiment The beam shaping lens divided into two described in the fourth embodiment of the present invention can also have all the effects described in the third embodiment by mounting it on the holder 11 described in the third embodiment.

In the above embodiment, the lens 22a is corresponding to the first lens body of the present invention and the lens 22b is corresponding to the second lens body of the present invention respectively. And the combinations of the base 16 and the beam shaping lens 22 shown in FIGS. 13 to 15 are corresponding to the lens part of the present invention.

The above embodiment described that the beam shaping lens 22 is based on the beam shaping lens 2 of the first embodiment. However, the beam shaping lens of the present invention may be comprised of two lens elements in which both the plane of incidence and outgoing plane have the circular cylindrical surfaces respectively.

In this case, the lens 22a as a first lens element and the lens 22b as a second lens element can be handled as the axial rotation symmetrical lenses respectively. Therefore, manufacturing of the lenses is easy as in the case of ordinary cylindrical lenses.

Figure 24:
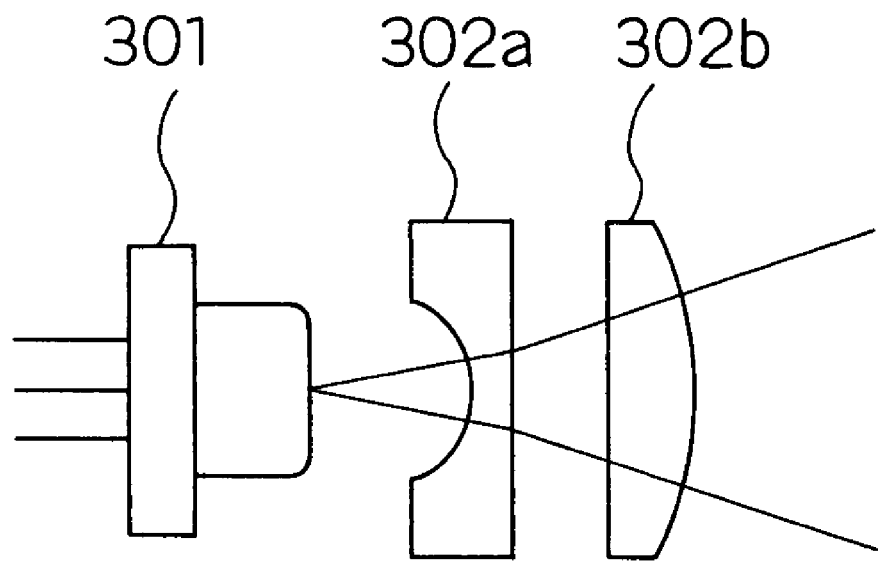
FIG. 24 is a schematic view describing a cylindrical lens of the second conventional example.

In this case, a difference from the second embodiment previously described by referring to FIG. 24 is that the lens 22a and lens 22b are joined. The second conventional example has the two cylindrical lenses 302a and 302b spatially separated, and so it has the problem that the spacing between them varies according to the temperature change so that the beam shaping magnification and the aberration vary. However, the lens 22a and lens 22b are joined by the adhesive so as to be integrated. Variations in thickness of the adhesive which is a thin film due to the temperature change are negligibly small, and so the beam shaping magnification and the aberration do not vary. To be more specific, it is possible to obtain the beam shaping lens 22 which is stable against the environmental variation. In this case, it is also preferable that the second plane 22o remote from the light source 1 have larger area than the first plane 22i close to the light source 1. As both the first plane 22i and second plane 22o are the cylindrical surfaces in this case, it is possible to regard the difference in area as-is as the differences in lengths of the circular arc and generating line.

Fifth Embodiment

Figure 16:
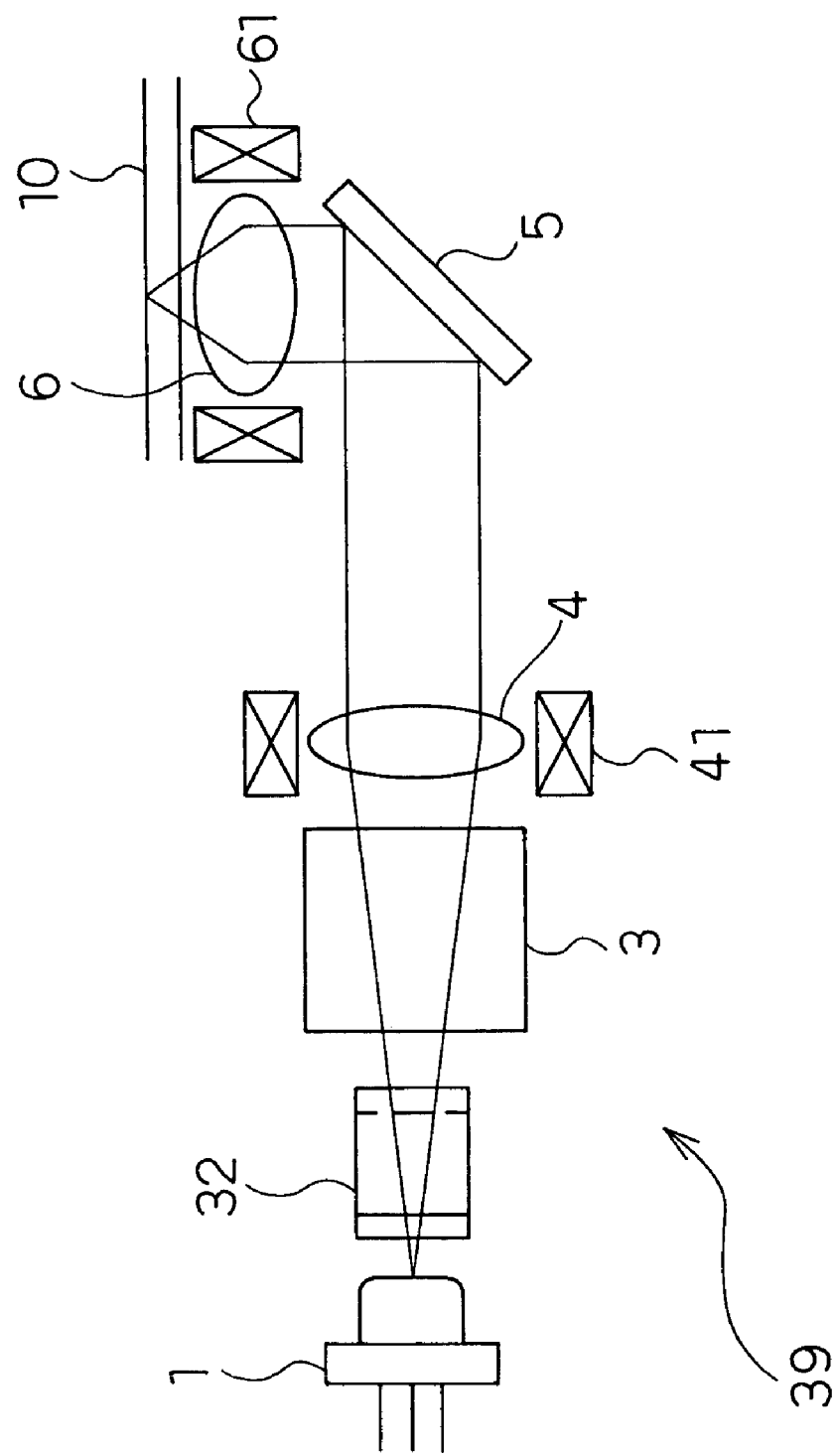
FIG. 16 is a schematic view showing the configuration of the optical head according to a fifth embodiment of the present invention.

FIG. 16 shows an optical head 39 of a fifth embodiment of the present invention. A beam shaping lens 32 is corresponding to the beam shaping lens 2 of the first or second embodiment. And the collimator lens 4 can be moved in the optical axis direction by a spherical aberration correction actuator 41.

In general, the spherical aberration arises if there is an error in the thickness of a protective layer of the optical disk 10. This spherical aberration can be counteracted by the spherical aberration generated by rendering the beam incident on the objective lens 6 as weak divergence or weak convergence.

Figure 26:
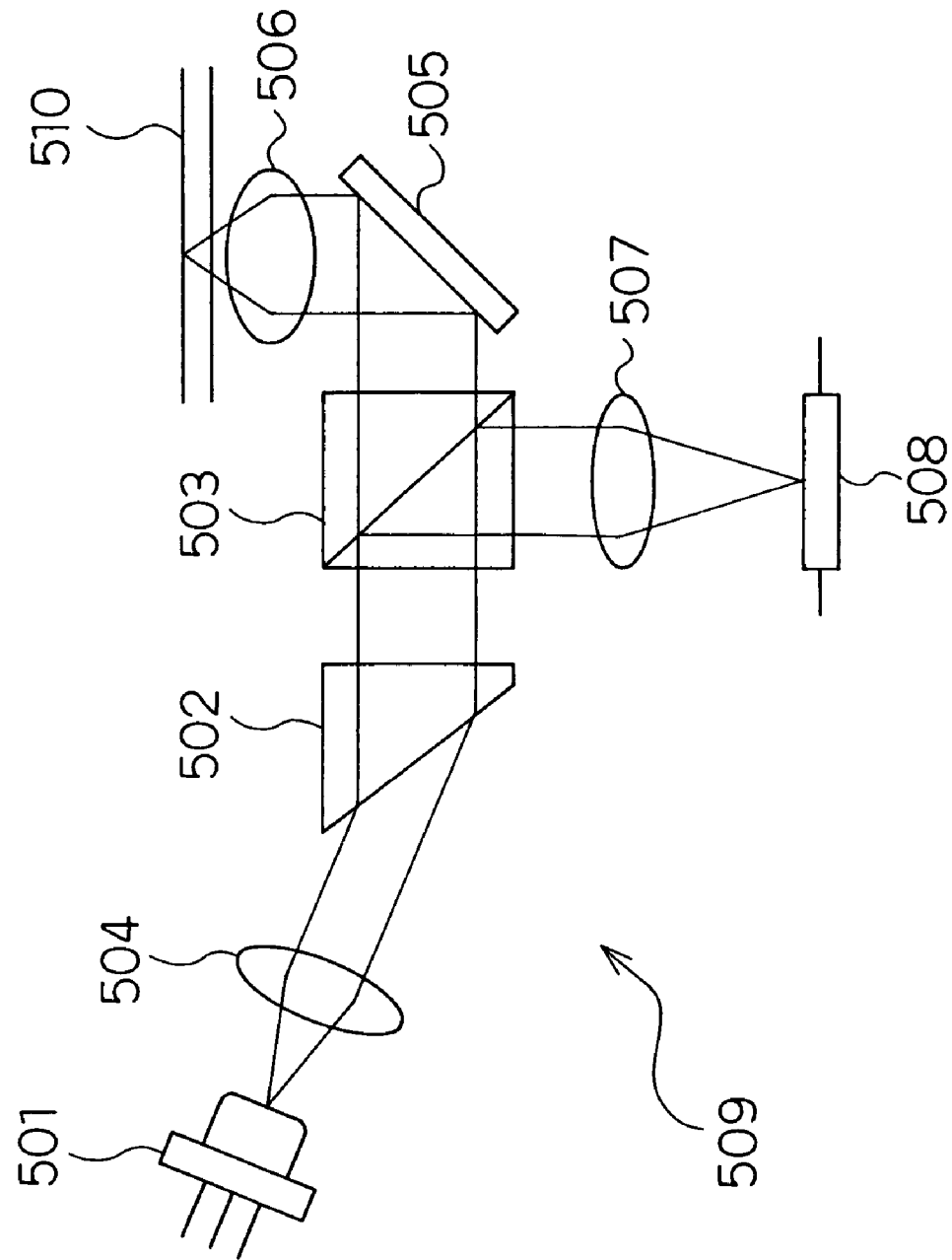
FIG. 26 is a schematic view describing the optical head of the fourth conventional example.

In the fourth conventional example, the beam is rendered parallel by the collimator lens 504 and is then shaped by the beam shaping prism 502 as shown in FIG. 26. If the collimator lens 504 is moved on such an optical head 509 in order to correct the spherical aberration due to the error in the thickness of the protective layer of an optical disk 510, the beam diverges or converges so as to generate the astigmatism by transmitting through the beam shaping prism 502. To be more specific, it is difficult to correct the spherical aberration. According to the fifth embodiment, the beam is shaped by the beam shaping lens 32 before the collimator lens 4. It is thereby possible to move the collimator lens 4 along the optical axis direction so as to correct the spherical aberration. Thus, it becomes possible to correct the spherical aberration with the collimator lens 4 only by using the beam shaping lens 32 which has good aberration performance and is stable against the environmental variation. And there is an advantageous effect that the cost can be minimized by adding only the spherical aberration correction actuator 41.

In the above embodiment, the objective lens 6 is equivalent to the objective lens of the present invention, and the collimator lens 4 is corresponding to the collimator lens of the present invention. The spherical aberration correction actuator 41 is the means of rendering the collimator lens movable in the optical axis direction of the incident beam.

Sixth Embodiment

Figure 17:
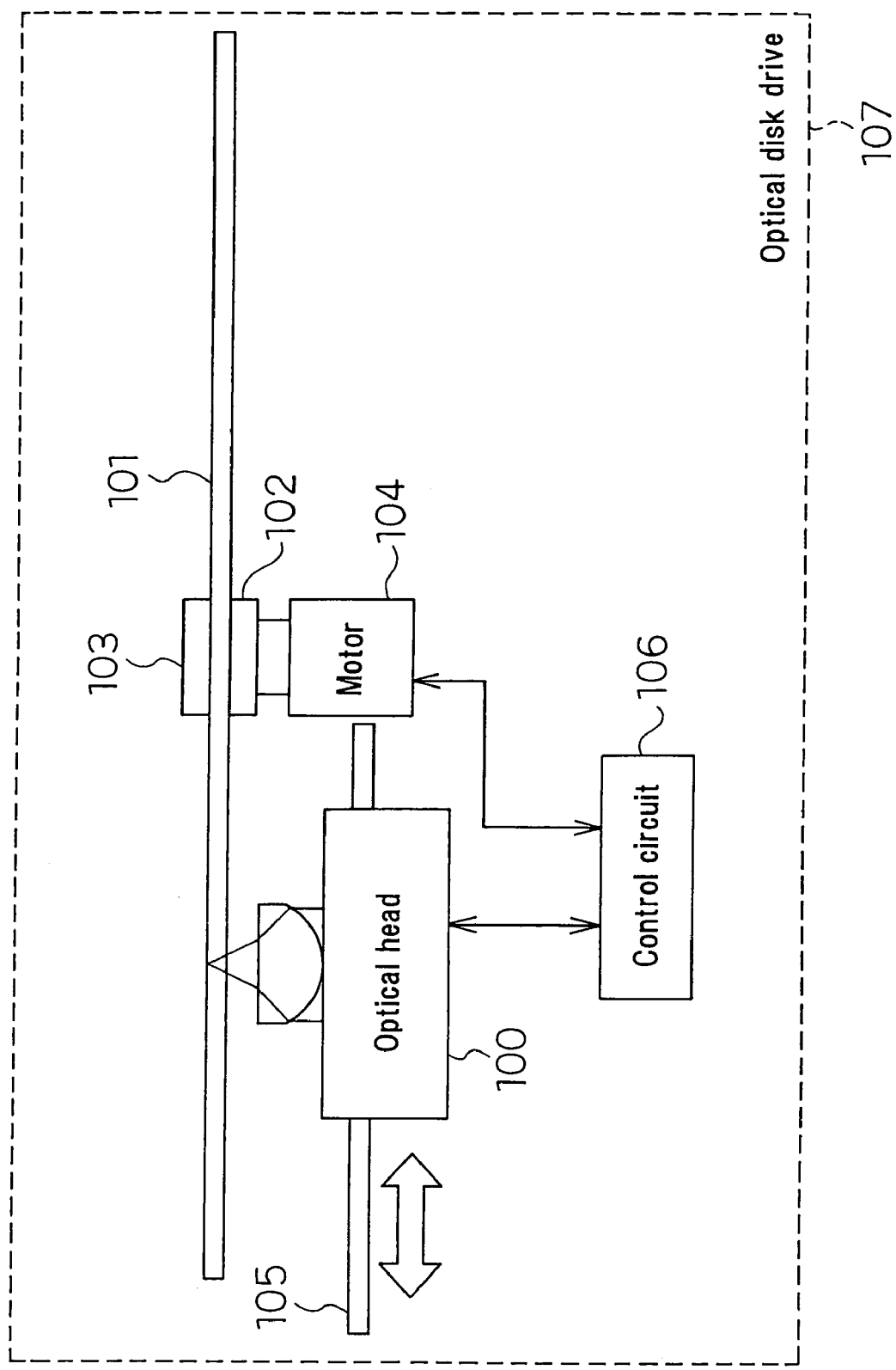
FIG. 17 is a schematic view of an optical disk drive using the optical head of the present invention.

FIG. 17 shows a configuration example of the entirety of an optical disk drive 107 as an optical information recording and reproducing apparatus. An optical disk 101 is fixed by being sandwiched between a turntable 102 and a damper 103, and is rotated by a motor (rotary system) 104. An optical head 100 using one of the optical heads of the first to fourth embodiments is on a traverse (transfer system) 105 so as to allow irradiated light to move from an inner circumference to an outer circumference of the optical disk 101. A control circuit 106 performs focus control, tracking control, traverse control and motor rotation control based on signals received from the optical head 100. The control circuit 106 also reproduces information from a regenerative signal and sends a record signal to the optical head 100. The traverse 105 is corresponding to transportation means of the present invention, and the control circuit 100 is corresponding to the control circuit.

Seventh Embodiment

Figure 18:
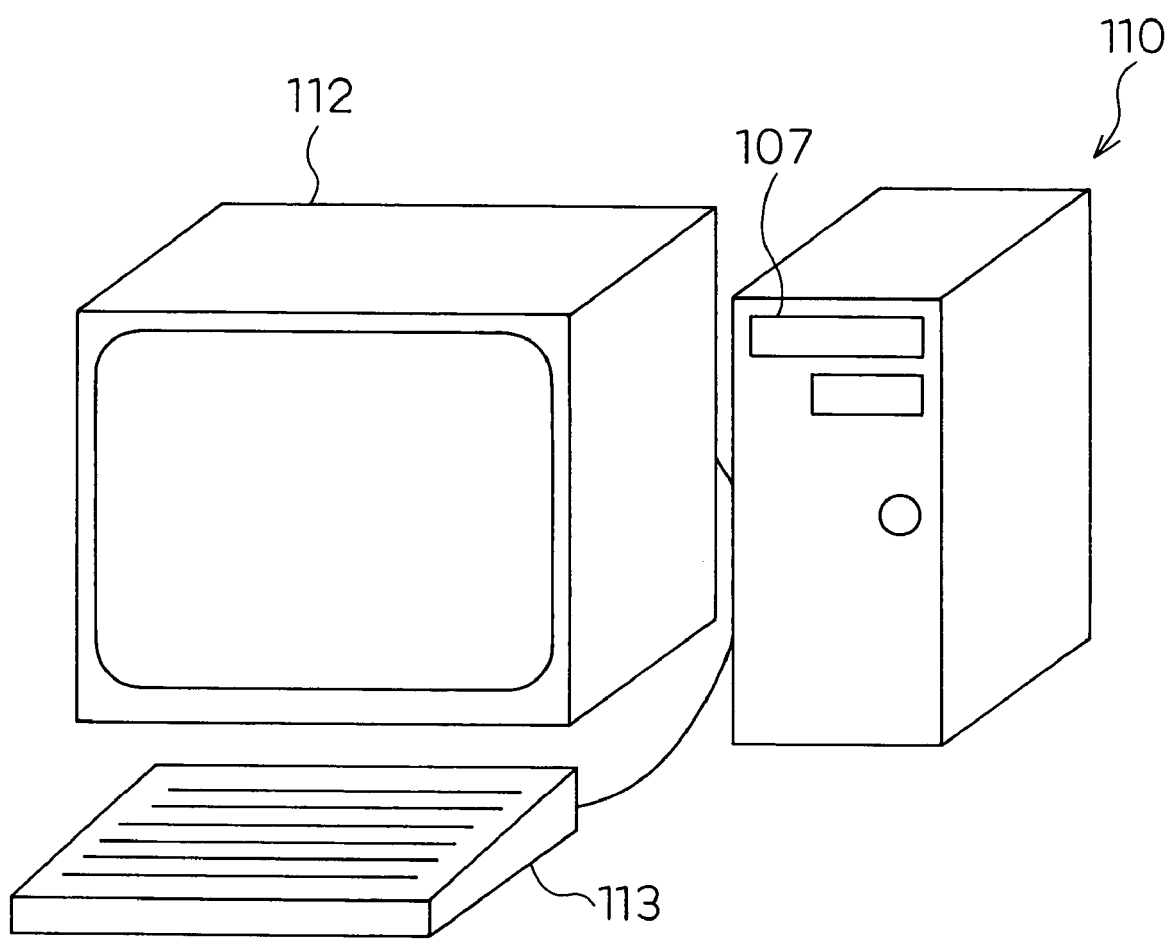
FIG. 18 is an external view of a PC using the optical disk drive of the present invention.

FIG. 18 shows an embodiment of a computer comprising the optical disk drive (optical information recording and reproducing apparatus) described in the sixth embodiment.

In FIG. 18, a PC (personal computer) 110 comprises the optical disk drive 107 of the sixth embodiment, a keyboard 113 of inputting the information, and a monitor 112 of displaying the information.

The computer comprising the optical disk drive of the sixth embodiment as an external storage has an effect of being capable of stably recording or reproducing the information on different kinds of optical disks and usable for a wide range of applications. The optical disk drive can back up a hard disk in the computer by exploiting its large capacity and exchange a program or data with others or carry it for one's own use by exploiting inexpensiveness and portability of the medium (optical disk) and compatibility allowing another optical disk drive to read the information. The optical disk drive also supports reproduction and recording on existing media such as a DVD and a CD.

Eighth Embodiment

Figure 19:
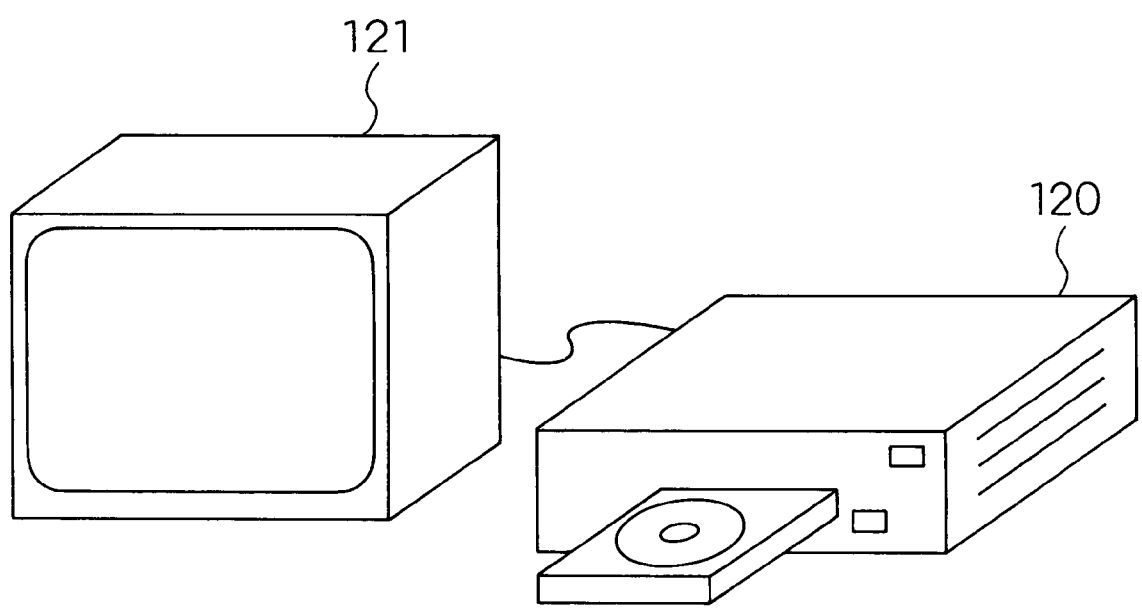
FIG. 19 is an external view of an optical disk recorder using the optical disk drive of the present invention.

FIG. 19 shows an embodiment of an optical disk recorder (image recording and reproducing apparatus) comprising the optical disk drive (optical information recording and reproducing apparatus) described in the sixth embodiment.

In FIG. 19, an optical disk recorder 120 has the optical disk drive 107 (not shown) of the sixth embodiment built therein, which is used by being connected to a monitor 121 of displaying a recorded image.

The optical disk recorder 120 having the optical disk drive 107 of the above-mentioned sixth embodiment has the effect of being capable of stably recording or reproducing the image on different kinds of optical disks and usable for a wide range of applications. The optical disk recorder can record the image on the medium (optical disk) and reproduce it at any time. The optical disk does not need rewinding work after recording or reproducing as in the case of a tape, and is capable of chase reproduction of reproducing a top portion of a program while recording it and simultaneous recording and reproduction of reproducing a previously recorded program while recording a program. It is possible to exchange the recorded image with others or carry it for one's own use by exploiting the inexpensiveness and portability of the medium and the compatibility allowing another optical disk recorder to read the information. It also supports reproduction and recording on existing media such as the DVD and CD.

Here, the case of comprising only the optical disk drive was described. However, it may also have a hard disk built therein or have a video tape recording and reproduction function built therein. In that case, it is easy to temporarily save or back up the image.

Ninth Embodiment

Figure 20:
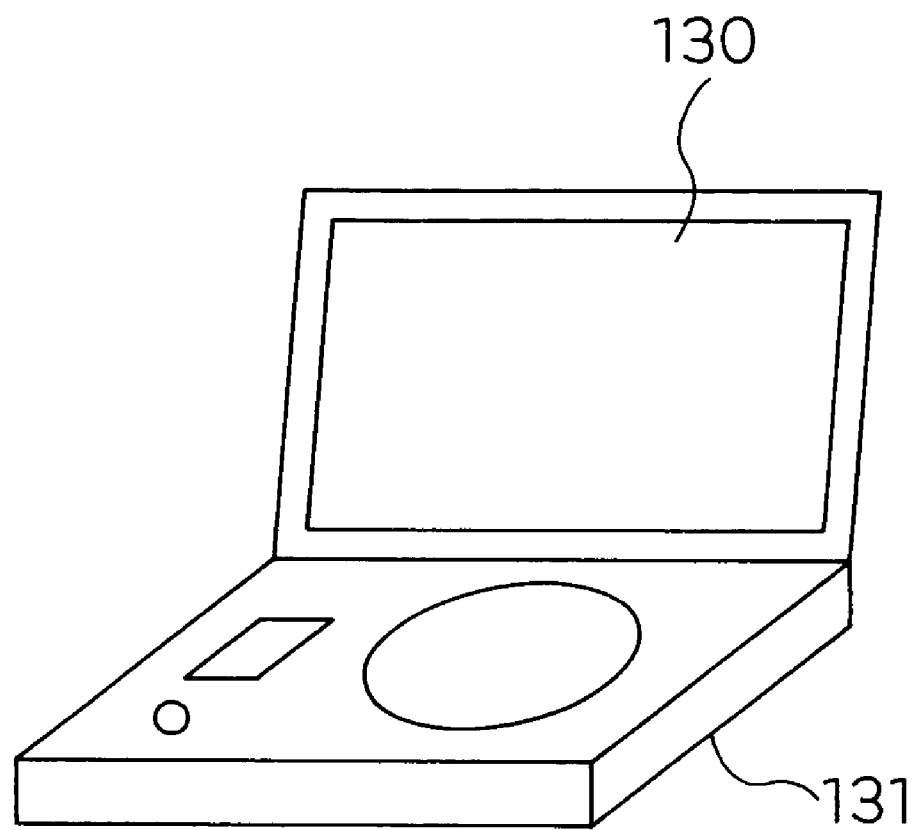
FIG. 20 is an external view of an optical disk player using the optical disk drive of the present invention.

FIG. 20 shows an embodiment of an optical disk player (image reproducing apparatus) comprising the optical disk drive (optical information recording and reproducing apparatus) described in the sixth embodiment.

In FIG. 20, an optical disk player 131 comprising a liquid crystal monitor 130 has the optical disk drive 107 (not shown) of the fifth embodiment built therein, and is capable of displaying the image recorded on the optical disk on the liquid crystal monitor 130. The optical disk player comprising the optical disk drive 107 of the above-mentioned sixth embodiment has the effect of being capable of stably recording or reproducing the information on different kinds of optical disks and usable for a wide range of applications.

The optical disk player can reproduce the image recorded on the medium (optical disk) at any time. The optical disk can access any point of the image and reproduce it with no need of rewinding work after the reproduction as in the case of a tape. It also supports the reproduction and recording on the existing media such as the DVD and CD.

Tenth Embodiment

Figure 21:
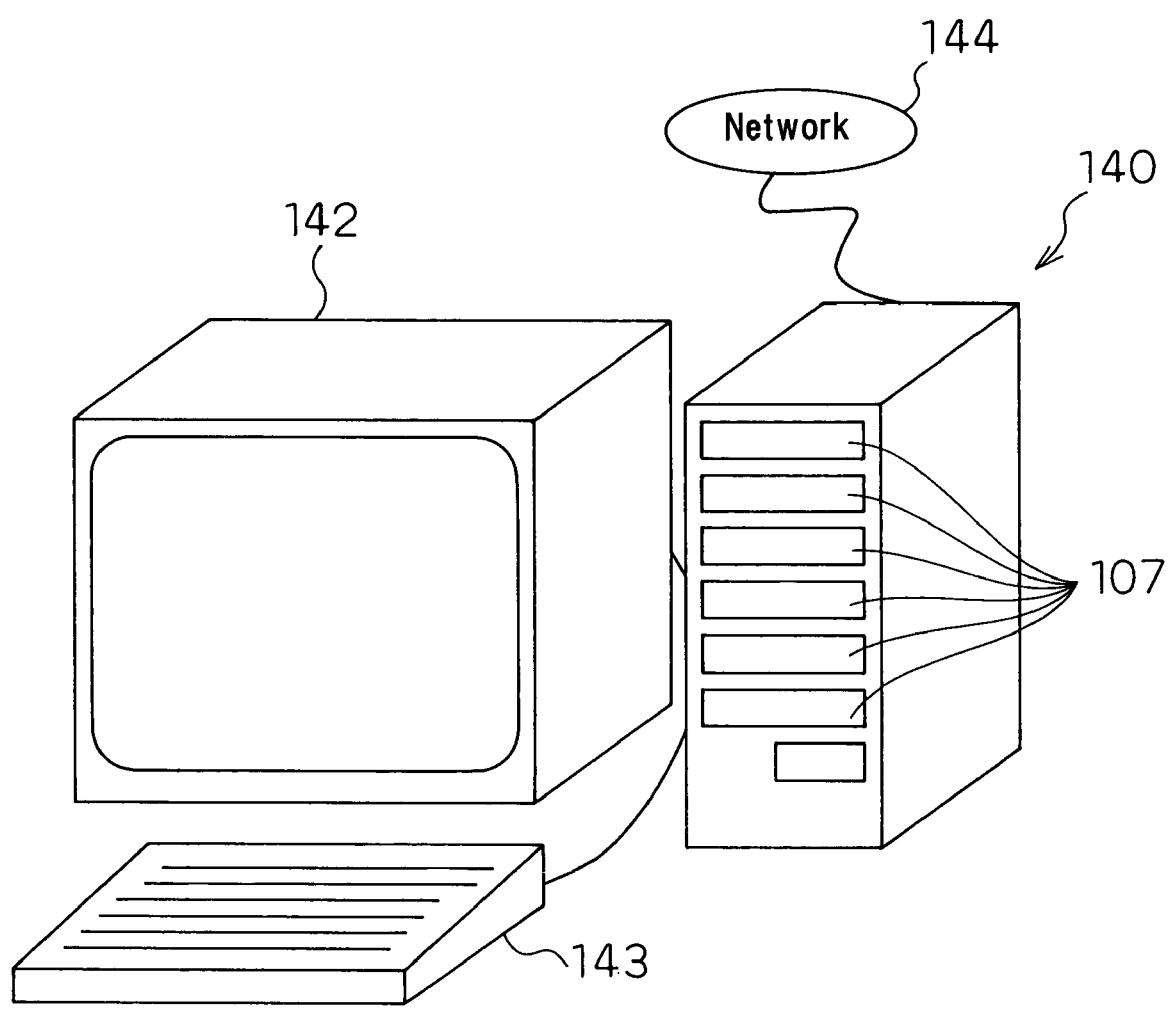
FIG. 21 is an external view of a server using the optical disk drive of the present invention.

FIG. 21 shows an embodiment of a server comprising the optical disk drive (optical information recording and reproducing apparatus) described in the sixth embodiment.

In FIG. 21, a server 140 comprises the optical disk drive 107 of the sixth embodiment, a monitor 142 of displaying the information and a keyboard 143 of inputting the information, and is connected to a network 144.

The server comprising the optical disk drive 107 of the above-mentioned sixth embodiment as the external storage has the effect of being capable of stably recording or reproducing the information on different kinds of optical disks and usable for a wide range of applications. The optical disk drive sends the information (images, voice, video, HTML documents, text documents and so on) recorded on the optical disk by exploiting its large capacity according to a request from the network 144. The optical disk drive also records the information sent from the network at the requested location. There are also the cases of sending the information recorded on the existing media such as the DVD, CD and so on because such information is reproducible.

Eleventh Embodiment

Figure 22:
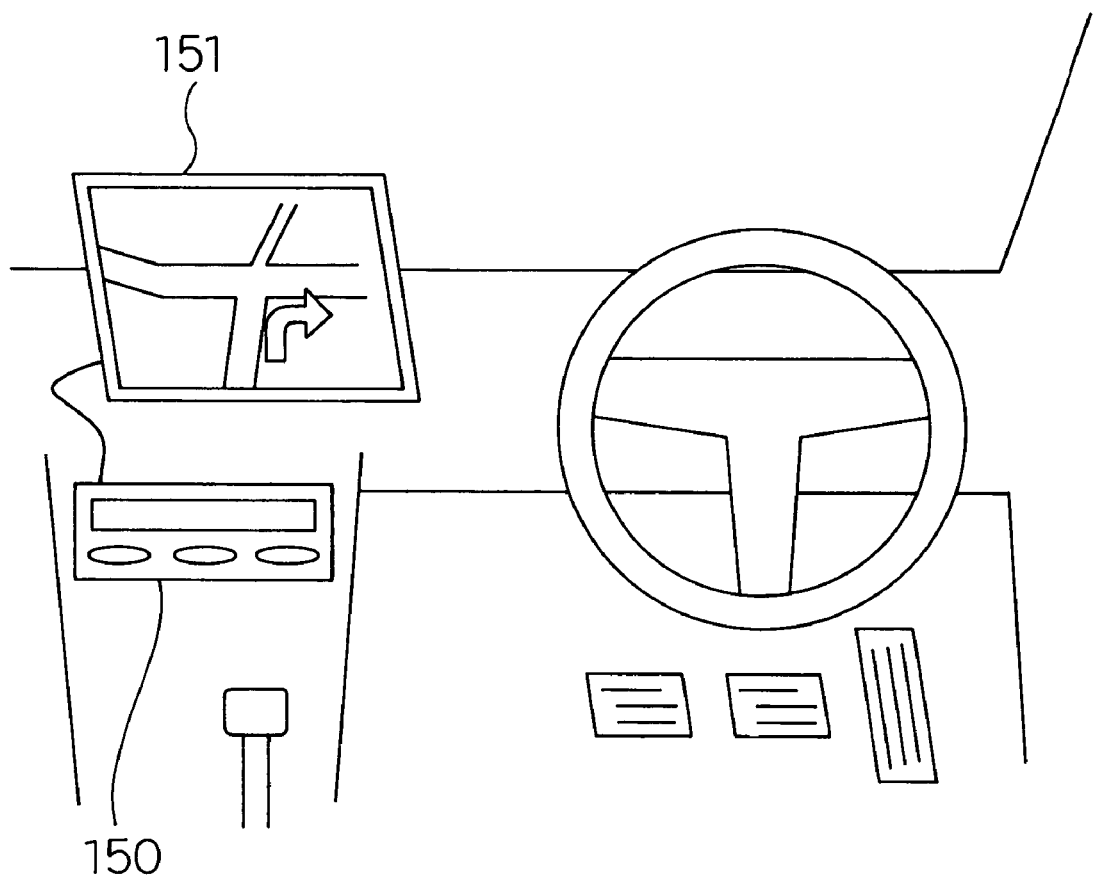
FIG. 22 is an external view of a car navigation system using the optical disk drive of the present invention.

FIG. 22 shows an embodiment of a car navigation system comprising the optical disk drive (optical information recording and reproducing apparatus) described in the sixth embodiment.

In FIG. 22, a car navigation system 150 has the optical disk drive 107 (not shown) of the sixth embodiment built therein, which is used by being connected to a monitor 151 of displaying land form and destination information.

The car navigation system comprising the optical disk drive 107 of the sixth embodiment has the effect of being capable of stably recording or reproducing the image on different kinds of optical disks and usable for a wide range of applications. The car navigation system 150 determines a current position based on geographical information recorded on the medium (optical disk) and the information of a global positioning system (GPS), a gyroscope, a speed meter and a distance recorder so as to display it on the liquid crystal monitor. If the destination is inputted, it determines an optimal route to the destination based on the geographical information and road information and displays it on the liquid crystal monitor.

It is possible, by using a large-capacity optical disk for the sake of recording the geographical information, to cover a wide area with one disk and provide detailed road information. It is also possible to provide the information on restaurants, convenience stores and gas stations located near the road by storing it on the optical disk at the same time. Furthermore, the road information becomes old and unrealistic as the time elapses. However, the optical disk has the compatibility and is inexpensive as the medium. Therefore, it is possible to obtain current information by exchanging it with a disk storing new road information. As it also supports the reproduction and recording on the existing media such as the DVD and CD, it is possible to see a movie and listen to music in the car.

The present invention has the effects of enhancing the shaping magnification, holding down the high-order aberration and stabilizing the shaping magnification and aberration as to the beam shaping lens, and is applicable to the beam shaping lens, lens part, optical head, the optical information recording and reproducing apparatus of irradiating light on the optical disk from the optical head to record or reproduce the information, and the computer, image recording and reproducing apparatus, image reproducing apparatus, server, car navigation system and so on using this.

What is claimed is:

1. A beam shaping lens for shaping an incident beam having an elliptic cross section into an outgoing beam having a substantially circular cross section, comprising:
    a plane of incidence which is a cylindrical surface having a generating line curving to form a non-circular cylindrical surface as an incidence side of the incident beam; and
    an outgoing plane which is a circular cylindrical surface as an outgoing side of the outgoing beam, wherein:
    a distance between both ends of the generating line of the circular cylindrical surface is larger than a distance between both ends of the generating line of the non-circular cylindrical surface,
    (A) the plane of incidence is curving convexly against an incidence direction of the incident beam, and the outgoing plane is curving concavely against the outgoing direction of the incident beam,
    (B) the circular cylindrical surface of the outgoing plane is provided so as to have its generating line intersect with all optical paths of a ray of light made by the incident beam refracted on the plane of incidence.

2. The beam shaping lens according to claim 1, comprising a pair of plane portions provided so as to sandwich the plane of incidence between them.

3. The beam shaping lens according to claim 2, comprising a pair of plane portions provided so as to sandwich the outgoing plane between them.

4. The beam shaping lens according to claim 1, wherein a shape of a cross section perpendicular to an optical axis of the incident beam is substantially square.

5. The beam shaping lens according to claim 1, wherein the shape of a cross section perpendicular to the optical axis of the incident beam is substantially circular or elliptic, having at least one linear portion.

6. The beam shaping lens according to claim 1, wherein a first lens body having the plane of incidence and a second lens body having the outgoing plane are joined on opposed joint surfaces.

7. A lens part comprising the beam shaping lens according to claim 1 and a mounting plate for mounting the beam shaping lens.

8. The lens part according to claim 7, wherein the beam shaping lens and the mounting plate are fixed at a fixed location closer to the plane of incidence than a center of the beam shaping lens.

9. The lens part according to claim 8, wherein the fixing is performed by applying an elastic force to a portion corresponding to the fixed location on an upper surface of the beam shaping lens.

10. The lens part according to claim 8, wherein the mounting plate has a difference in level between the plane of incidence side including the fixed location and the outgoing plane of the beam shaping lens.

11. The lens part according to claim 8, wherein the mounting plate has a groove portion provided in a direction intersecting with the optical axis direction of the incident beam between the plane of incidence side including the fixed location and the outgoing plane of the beam shaping lens.

12. An optical head comprising:
    the lens part according to claim 7;
    a light source;
    condensing means of condensing a diverging beam emitted from the beam shaping lens of the lens part; and
    a detector of detecting a predetermined beam.

13. An optical information recording and reproducing apparatus, including:
    the optical head according to claim 12;
    moving means of relatively moving the optical head and the optical information recording medium; and
    a control circuit of controlling the optical head and the moving means based on a signal obtained from the optical head.

14. A computer comprising the optical information recording and reproducing apparatus according to claim 13 as an external storage.

15. An image recording and reproducing apparatus comprising the optical information recording and reproducing apparatus according to claim 13, wherein at least an image is recorded and reproduced on the optical information recording medium.

16. An image reproducing apparatus comprising the optical information recording and reproducing apparatus according to claim 13, wherein at least an image is reproduced on the optical information recording medium.

17. A server comprising the optical information recording and reproducing apparatus according to claim 13 as an external storage.

18. A car navigation system comprising the optical information recording and reproducing apparatus according to claim 13 as an external storage.

19. A beam shaping lens according to claim 1, wherein the plane of incidence is placed so as to receive a diverging beam as the incident beam.

* * * * *